US012597132B2

(12) United States Patent
Liao et al.

(10) Patent No.: US 12,597,132 B2
(45) Date of Patent: Apr. 7, 2026

(54) IMAGE PROCESSING METHOD AND APPARATUS

(71) Applicants: Tencent Technology (Shenzhen) Company Limited, Shenzhen (CN); The Fourth Hospital of Hebei Medical University (Hebei Cancer Hospital), Shijiazhuang (CN)

(72) Inventors: Jun Liao, Shenzhen (CN); Jianhua Yao, Shenzhen (CN); Yueping Liu, Shenzhen (CN); Lingling Zhang, Shenzhen (CN)

(73) Assignees: Tencent Technology (Shenzhen) Company Limited, Shenzhen (CN); The Fourth Hospital of Hebei Medical University (Hebei Cancer Hospital), Shijiazhuang (CN)

( * ) Notice: Subject to any disclaimer, the term of this patent is extended or adjusted under 35 U.S.C. 154(b) by 370 days.

(21) Appl. No.: 18/224,201

(22) Filed: Jul. 20, 2023

(65) Prior Publication Data

US 2023/0368379 A1      Nov. 16, 2023

Related U.S. Application Data

(63) Continuation of application No. PCT/CN2022/132171, filed on Nov. 16, 2022.

(30) Foreign Application Priority Data

Jan. 25, 2022    (CN) .......................... 202210086842.8

(51) Int. Cl.
    *G06T 7/00*          (2017.01)
    *G06V 10/25*        (2022.01)
          (Continued)

(52) U.S. Cl.
    CPC ............ *G06T 7/0012* (2013.01); *G06V 10/25* (2022.01); *G06V 10/56* (2022.01); *G06V 10/60* (2022.01);
          (Continued)

(58) Field of Classification Search
    None
    See application file for complete search history.

(56) References Cited

U.S. PATENT DOCUMENTS 10,117,582 B2 * 11/2018 Panasyuk ............... A61B 5/418
2011/0057946 A1 *  3/2011 Yamamoto ............. G06V 10/56
                                                      345/589

(Continued)

FOREIGN PATENT DOCUMENTS

CN         110555835         12/2019
CN         112907581          6/2021
          (Continued)

OTHER PUBLICATIONS

Trajanovski Stojan et al, "Tongue Tumor Detection in Hyperspectral Images Using Deep Learning Semantic Segmentation", IEEE Transactions on Biomedical Engineering, IEEE, USA, vol. 68, No. 4, doi: 10.1109/TBME.2020.3026683, ISSN 0018-9294, (Sep. 25, 2020) (Year: 2020).*

(Continued)

*Primary Examiner* — Nancy Bitar
(74) *Attorney, Agent, or Firm* — Crowell & Moring LLP

(57)            ABSTRACT

An image processing method and apparatus are provided. The method includes: acquiring a sample image, the sample image comprising an image obtained by image-capturing a sample within a preset optical waveband; processing a first image corresponding to at least one preset wavelength within the preset optical waveband in the sample image, to obtain a pseudo-color image; performing region division on (Continued)

the sample image according to a difference in sample element types in the sample image to obtain a region division result, the sample element types comprising a recognition element type; and determining an image region comprising the recognition element type from the sample image based on the pseudo-color image and the region division result.

18 Claims, 17 Drawing Sheets

(51) Int. Cl.

| | |
|---|---|
| *G06V 10/56* | (2022.01) |
| *G06V 10/60* | (2022.01) |
| *G06V 10/764* | (2022.01) |
| *G06V 20/70* | (2022.01) |

(52) U.S. Cl.
CPC ............ *G06V 10/764* (2022.01); *G06V 20/70* (2022.01); *G06T 2207/30024* (2013.01)

(56) References Cited

U.S. PATENT DOCUMENTS

| | | | |
|---|---|---|---|
| 2012/0029348 A1* | 2/2012 | Yaroslavsky | ...... G01N 21/6456 600/431 |
| 2018/0116526 A1* | 5/2018 | Panasyuk | ............. A61B 5/4842 |
| 2020/0167910 A1 | 5/2020 | Takeuchi et al. | |

FOREIGN PATENT DOCUMENTS

| | | |
|---|---|---|
| CN | 113139628 A | 7/2021 |
| CN | 113450305 | 9/2021 |
| CN | 114445362 | 5/2022 |
| WO | WO 2020/081340 A1 | 4/2020 |
| WO | WO 2021/072408 A1 | 4/2021 |
| WO | WO 2021/231967 A1 | 11/2021 |

OTHER PUBLICATIONS

Chinese-language Office Action issued in Chinese Application No. 202210086842.8 dated Jul. 11, 2025, with English translation (14 pages).

International Search Report issued Feb. 10, 2023 in International (PCT) Application No. PCT/CN2022/132171.

Japanese-language Office Action issued in Japanese Application No. 2024-525788 dated Feb. 12, 2025 with English translation (16 pages).

Hao et al.; "Fusing Multiple Deep Models for In Vivo Human Brain Hyperspectral Image Classification to Identify Glioblastoma Tumor", IEEE Transactions on Instrumentation and Measurement, Oct. 2021, vol. 70, (14 pages).

Leon et al.; "VNIR-NIR Hyperspectral Imaging Fusion Targeting Intraoperative Brain Cancer Detection", Scientific Reports, Oct. 2021, vol. 11, No. 1, (12 pages).

Trajanovski et al.; "Tongue Tumor Detection in Hyperspectral Images Using Deep Learning Semantic Segmentation", IEEE Transactions on Biomedical Engineering, Sep. 2020, vol. 68, No. 4, (11 pages).

English-language Office Action issued in European Application No. 22923409.1 dated Apr. 29, 2025 (13 pages).

* cited by examiner

Hollow organ

Kidney

Mammary gland

Lung

IMAGE PROCESSING METHOD AND APPARATUS

RELATED APPLICATION

This application is a continuation application of PCT Patent Application No. PCT/CN2022/132171, filed on Nov. 16, 2022, which claims priority to Chinese Patent Application No. 202210086842.8, entitled "IMAGE PROCESSING METHOD AND APPARATUS, DEVICE, READABLE STORAGE MEDIUM, AND PROGRAM PRODUCT" filed with China National Intellectual Property Administration on Jan. 25, 2022, wherein the content of the above-referenced applications is incorporated herein by reference in its entirety.

FIELD OF THE TECHNOLOGY

This disclosure relates to the field of medical data processing, and in particular, to an image processing method and apparatus, a device, a readable storage medium, and a program product.

BACKGROUND OF THE DISCLOSURE

Usually, after being surgically resected, a collected pathological specimen including a tumor tissue will be further studied and sampled to find and recognize a boundary of the tumor issue in the pathological specimen, so as to analyze the tumor tissue more correctly and obtain a more valuable medical analysis result.

In the related technology, after a surgically resected pathological specimen is fixed with formalin, a boundary of a tumor tissue is usually determined by a pathologist by visual observation. Or the pathological specimen is scanned by using an X-ray device, and a doctor interprets an X-ray image, determines a boundary of a tumor tissue, and then samples the tumor tissue.

However, when a boundary of a tumor tissue is determined by the foregoing methods, it is difficult to recognize some lesions with inconspicuous tumor beds with the naked eye. Moreover, the X-ray device is difficult to widely popularize due to its high price.

SUMMARY

Embodiments of this disclosure provide an image processing method and apparatus, a device, a readable storage medium, and a program product, which can analyze a sample according to spectral characteristics of a first sample at different wavelengths to improve the accuracy of pathological sampling. Technical solutions will be described below.

In a first aspect, an image processing method is provided, which includes:

acquiring a sample image, the sample image comprising an image obtained by image-capturing a sample within a preset optical waveband;

processing a first image corresponding to at least one preset wavelength within the preset optical waveband in the sample image, to obtain a pseudo-color image;

performing region division on the sample image according to a difference in sample element types in the sample image to obtain a region division result, the sample element types comprising a recognition element type; and determining an image region comprising the recognition element type from the sample image based on the pseudo-color image and the region division result.

In another aspect, an image processing apparatus is provided, which includes a memory operable to store computer-readable instructions and a processor circuitry operable to read the computer-readable instructions. When executing the computer-readable instructions, the processor circuitry is configured to:

acquire a sample image, the sample image comprising an image obtained by image-capturing a sample within a preset optical waveband;

process a first image corresponding to at least one preset wavelength within the preset optical waveband in the sample image, to obtain a pseudo-color image;

perform region division on the sample image according to a difference in sample element types in the sample image to obtain a region division result, the sample element types comprising a recognition element type; and determine an image region comprising the recognition element type from the sample image based on the pseudo-color image and the region division result.

In another aspect, a non-transitory machine-readable media is provided, which has instructions stored thereon. When being executed, the instructions are configured to cause a machine to:

acquire a sample image, the sample image comprising an image obtained by image-capturing a sample within a preset optical waveband;

process a first image corresponding to at least one preset wavelength within the preset optical waveband in the sample image, to obtain a pseudo-color image;

perform region division on the sample image according to a difference in sample element types in the sample image to obtain a region division result, the sample element types comprising a recognition element type; and determine an image region comprising the recognition element type from the sample image based on the pseudo-color image and the region division result.

The technical solutions provided in the embodiments of this disclosure have at least the following beneficial effects.

An image region is determined with reference to a pseudo-color image and a region division result, which may avoid a situation where a size, a region, and the like of a tumor tissue are determined by a doctor by visual observation and interpretation only, and thus reduces the inaccuracy of determination of a region of a tumor tissue in a patient. A sample is image-captured based on a preset optical waveband to obtain a sample image, at least one preset wavelength with a good effect is selected from the preset optical waveband, and a first image corresponding to the preset wavelength is determined from the sample image and processed to obtain a pseudo-color image that can reflect an advantage of the preset wavelength accurately. In addition, region division is performed on the sample image according to a difference in recognition element types in the sample image to obtain a region division result. An image region including the recognition element type is determined with reference to the pseudo-color image and the region division result, so as to determine position information of a region to be recognized (such as a tumor tissue), which improves the accuracy of pathological sampling and reduces the difficulty of pathological sampling. Analysis of spectral characteristics corresponding to the sample at different wavelengths is easy to operate and low in cost, so it is easy to widely apply.

DESCRIPTION OF EMBODIMENTS

Figure 1:
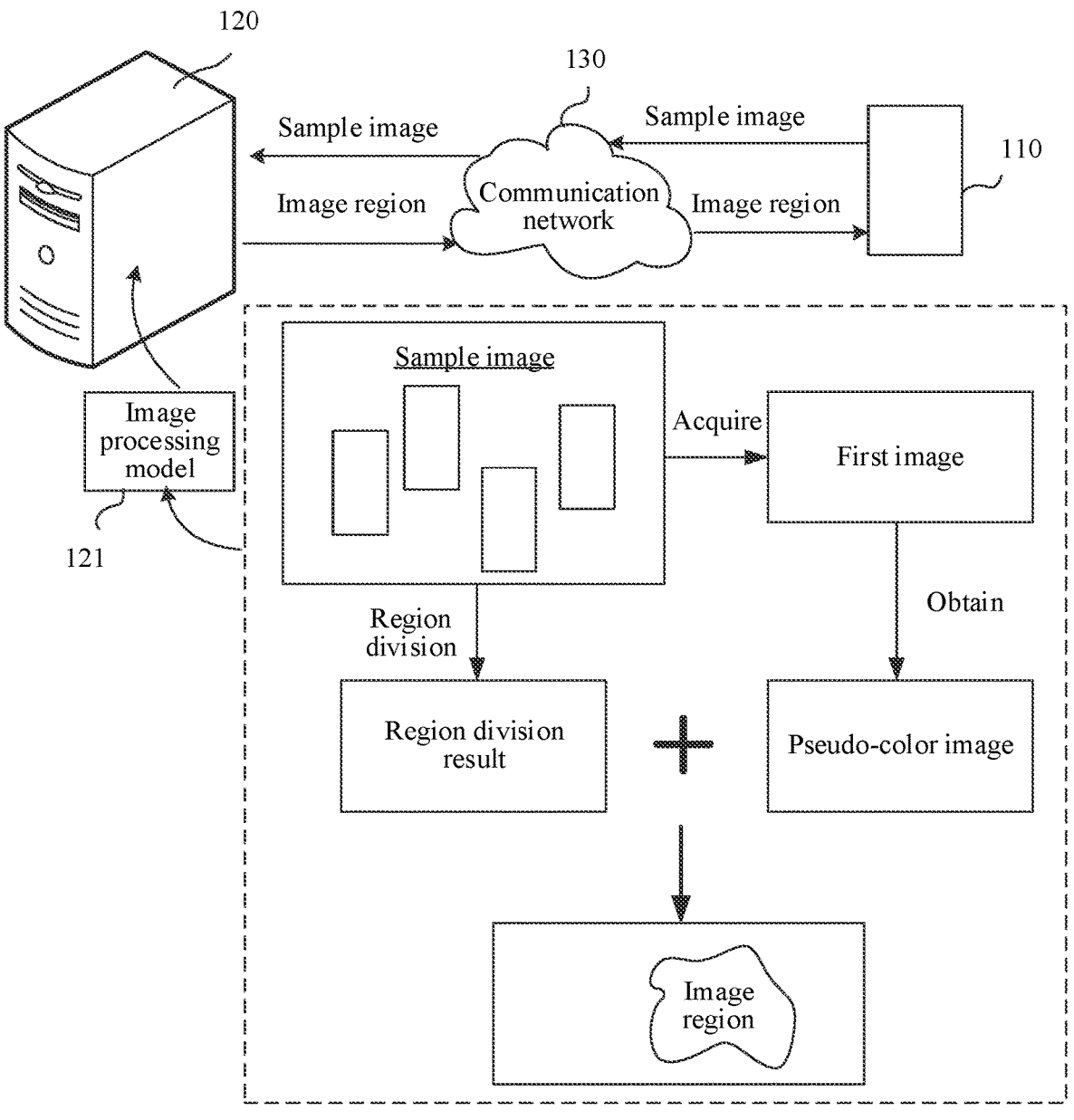
FIG. 1 is a schematic diagram of an implementation environment according to an exemplary embodiment of this disclosure.

First, several terms involved in the embodiments of this disclosure are briefly introduced.

Artificial Intelligence (AI): AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

Machine Learning (ML): ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

In the related technology, a boundary of a tumor tissue is usually determined by a pathologist by visual observation. Or a pathological specimen is scanned by using an X-ray device, and a doctor interprets an X-ray image, determines a boundary of a tumor tissue, and then samples the tumor tissue. However, when a boundary of a tumor tissue is determined by the foregoing methods, it is difficult to recognize some lesions with inconspicuous tumor beds with the naked eye. Moreover, the X-ray device is difficult to widely popularize due to its high price.

In the embodiments of this disclosure, an image processing method is provided. According to the method, a sample is analyzed according to spectral characteristics of the sample at different wavelengths, which improves the accuracy of pathological sampling. The image processing method obtained by training of this application may be applied to at least one of the following scenarios.

I. The Medical Field

During surgical resection of a tumor, it is necessary to accurately determine the position of the tumor margin, so as to realize the process of complete resection of the tumor area, and prevent a disease relapse of a patient and avoid a second surgery. Postoperative histopathological analysis is a golden standard for tumor diagnosis. In order to accurately obtain focus information of the patient, the process of selecting a pathological tissue mass by a doctor is particularly important. Miss-selection of a tissue mass containing a focus will limit the ability of the pathologist to make an accurate diagnosis. However, selection of excessive tissue masses will greatly increase the workload of slide preparation and reduce the medical efficiency. Exemplarily, according to the foregoing image processing method, a tissue (such as a kidney and a mammary gland) with a focus is taken as a sample, the sample is image-captured within a preset optical waveband to obtain sample images, a first image corresponding to a preset wavelength is selected from the sample images to obtain a pseudo-color image, region division is performed on the sample image according to sample element types in the sample image to obtain a region division result, and finally an image region corresponding to a tumor tissue can be accurately determined by synthetically analyzing the region division result and the pseudo-color image to realize the process of recognition of the image region. The foregoing method may assist a pathologist in finding a focus area more quickly, and may also reduce the instrument cost of an image device such as an X-ray device. According to the foregoing method, a more popular and affordable optical spectrum instrument is used for acquiring a sample image, and the sample image with spectral information is analyzed, so that the medical cost is reduced, and meanwhile the determination accuracy of a tumor tissue is improved.

II. Food Testing Field

Food safety is related to life safety. Food often contains different components. Unhealthy components or incorrect component ratios may cause food safety incidents. Exemplarily, according to the foregoing image processing method, a food is taken as a sample, the sample is image-captured within a preset optical waveband to obtain sample images, a first image corresponding to a preset wavelength is selected from the sample images to obtain a pseudo-color image, region division is performed on the sample image according to sample element types in the sample image to obtain a region division result, finally regions corresponding to different components in the food can be accurately determined by synthetically analyzing the region division result and the pseudo-color image, and an image region corresponding to an unhealthy component is determined to realize the process of recognition of the image region. The foregoing method may assist a food regulatory agency in supervising food better. According to the foregoing method, the image region is recognized more accurately with reference to the pseudo-color image determined according to the first wavelength and the region division result.

It is worthwhile to note that the foregoing application scenarios are merely illustrative examples, and the image processing method according to the embodiments may further applied to other scenarios, which are not limited herein.

It may be appreciated that for relevant data such as user information that is involved in specific implementations of this disclosure, when the foregoing embodiments of this disclosure are applied to a specific product or technology, user permission or consent is required, and the collection, use, and processing of the relevant data need to comply with relevant laws and regulations and standards of relevant countries and regions.

Secondly, an implementation environment involved in the embodiments of this disclosure is described. Exemplarily, referring to FIG. 1, the implementation environment involves a terminal 110 and a server 120 that are connected via a communication network 130.

In some embodiments, the terminal 110 is installed with an application program with an image acquisition function. In some embodiments, the terminal 110 is configured to transmit a sample image to the server 120. The server 120 may determine an image region including a recognition element type from the sample image through an image processing model 121 according to spectral information corresponding to the sample image, and mark the image region in a particular way and feed back the marked image region to the terminal 110 for display.

The image processing model 121 is configured to: select a preset wavelength from a preset optical waveband, determine a first image corresponding to the preset wavelength from the sample image, and process the first image to obtain a pseudo-color image; and perform region division on the sample image according to sample element types in the sample image to obtain a region division result corresponding to the sample image, and determine an image region from the sample image with reference to the region division result and the pseudo-color image, the image region being used for indicating position information of a recognition element type. For example, the sample is a pathological sample, the image region determined after the sample is analyzed is a region corresponding to a tumor tissue, and region information corresponding to the tumor tissue is determined more accurately. The foregoing process is an example of non-exclusive cases of the application process of the image processing model 121.

It is worthwhile to note that the foregoing terminal includes, but is not limited to, a mobile terminal such as a mobile phone, a tablet computer, a portable laptop, a smart voice interaction device, a smart household appliance, and an on-board terminal, and may be implemented as a desktop or the like. The foregoing server may be an independent physical server, may be a server cluster or distributed system composed of multiple physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

The cloud technology refers to a hosting technology that unifies a series of resources, such as hardware, application programs, and networks, in a wide area network or a local area network to realize data computing, storage, processing, and sharing.

In some embodiments, the foregoing server may be implemented by a node in a blockchain system.

Figure 2:
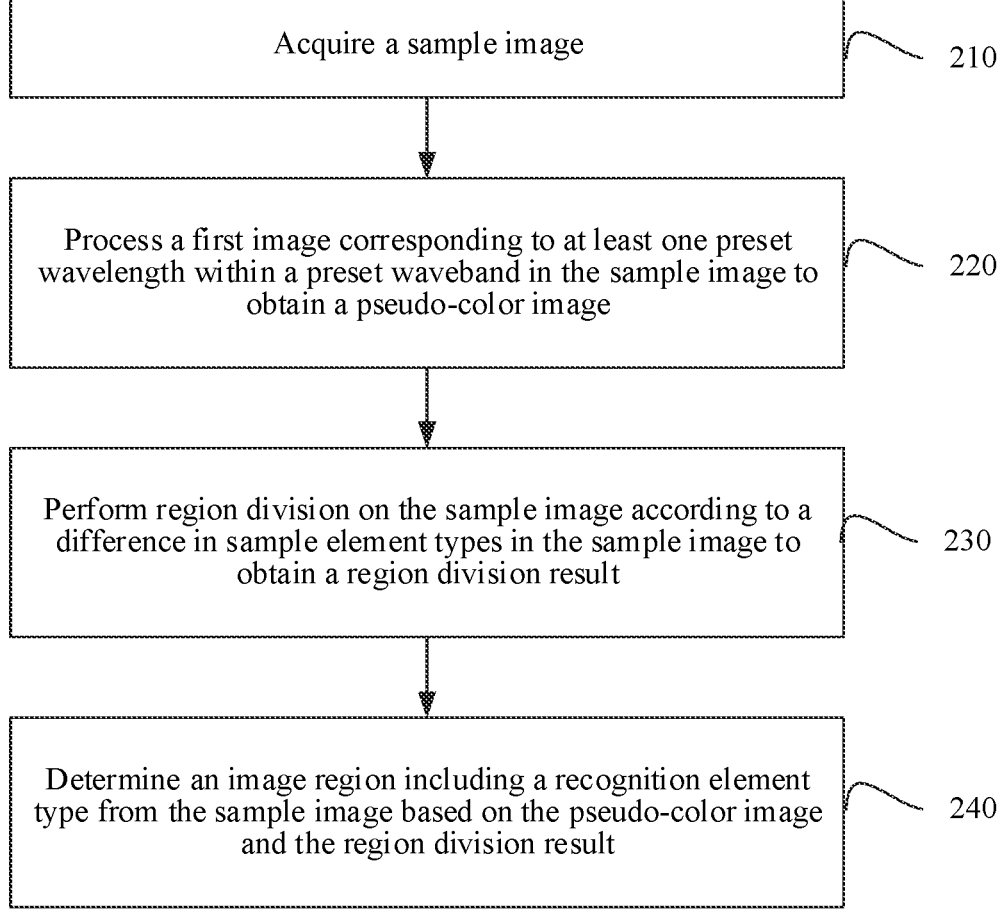
FIG. 2 is a flowchart of an image processing method according to an exemplary embodiment of this disclosure.

With reference to the foregoing term introduction and application scenarios, the image processing method of this disclosure is described. A case where the method is applied to server is taken as an example, and as shown in FIG. 2, the method includes step 210 to step 240.

Step 210: Acquire a sample image.

The sample image includes an image obtained by image-capturing a sample within a preset optical waveband.

The waveband is used for indicating a range of wavelengths. For example, a visible light band is used for indicating a wavelength range of 380 nm to 750 nm; a near-infrared band is used for indicating a wavelength range of 750 nm to 2500 nm; and a middle-infrared band is used for indicating a wavelength range of 2500 nm to 25000 nm.

In an implementation, A lighting source providing wavelengths includes a halogen lamp, an incandescent lamp, a light emitting diode (LED) light source, and the like. Exemplarily, the preset optical waveband is used for indicating a waveband set in advance, and the lighting source providing wavelengths covers the preset optical waveband. For example, the preset optical waveband is a waveband of 400 nm to 1700 nm, a selected lighting source covers the waveband of 400 nm to 1700 nm; or, the preset optical waveband is a waveband of 400 nm to 1700 nm, a lighting source A may provide a waveband of 400 nm to 1200 nm, a lighting source B may provide a waveband of 1100 nm to 1800 nm, and the lighting source A and the lighting source B are taken as lighting sources providing the preset optical waveband.

A sample is used for indicating a sample to be analyzed. In an implementation, the sample is a surgically resected pathological sample, and after the surgically resected pathological sample is analyzed, position information, property information, and the like of the pathological sample may be learned; or, the sample is a chemical mixture, and after the chemical mixture is analyzed, component information, ratio information, and the like of the mixture may be learned; or, the sample is a gem, and after the gem is analyzed, structural information and the like of the gen may be learned.

In an implementation, a push-broom acquisition operation is performed on the sample to obtain the sample image.

Figure 3:
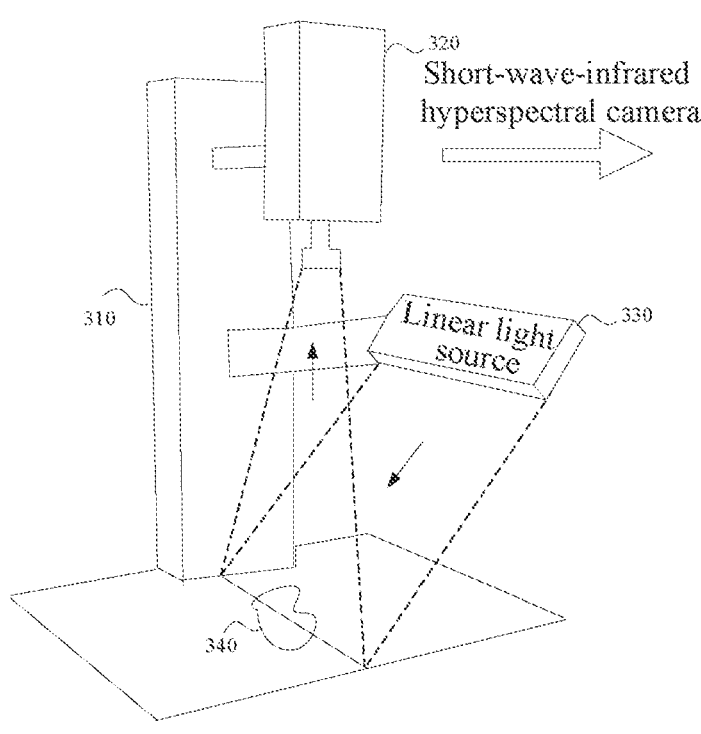
FIG. 3 is a schematic diagram of acquisition of a sample image according to an exemplary embodiment of this disclosure.

Push-broom shooting is an acquisition method of scanning point by point along a scanning line and imaging, and the push-broom acquisition operation is performed based on an acquisition device. Exemplarily, as shown in FIG. 3, a push-broom short-wave-infrared hyperspectral imaging system includes a sample bench 310, a short-wave-infrared hyperspectral camera 320, a linear light source 330, and a sample 340. The hyperspectral camera 320 is a combination of the imaging technology and the spectral detection technology and is configured to acquire a sample image with spectral information, the sample image is a hyperspectral image, the hyperspectral image is three-dimensional, the x axis and the y axis are used for representing coordinates of two-dimensional information, and the z axis is used for representing wavelength information. Compared with the ordinary imaging technology, the hyperspectral image is added with the spectral information of the image, has a higher spectral resolution, and can reflect a sample condition of the sample from a wider waveband and more levels of spectral dimensions, so that the sample image can reflect spatial information and spectral information of the sample. When the hyperspectral sample image is analyzed, a wavelength with a higher resolution and a better analysis effect is selected from a wider waveband and used for subsequent analysis of the sample image. That is, the sample image is an image with spectral information.

Exemplarily, the hyperspectral image is taken by using a reflective hyperspectral camera with an effective photosensitive range of 900 nm to 1700 nm, a spectral resolution is about 5 nm, and an image resolution is 300,000 pixels.

In an implementation, after the preset optical waveband is determined, the sample is illuminated with a lighting source and image-captured multiple times at different wavelengths within the preset optical waveband to obtain multiple sample images corresponding to the sample. Exemplarily, the preset optical waveband is a waveband of 900 nm to 1700 nm (a waveband selected from the near-infrared band), the sample is a surgically resected pathological sample, a halogen lamp is taken as a lighting source, a hyperspectral camera is taken as an image acquisition device, and the surgically resected pathological sample is image-captured at different wavelengths. For example, one image is taken by using the hyperspectral camera at each wavelength within the preset optical waveband to obtain multiple sample images corresponding to different wavelengths.

Figure 4:
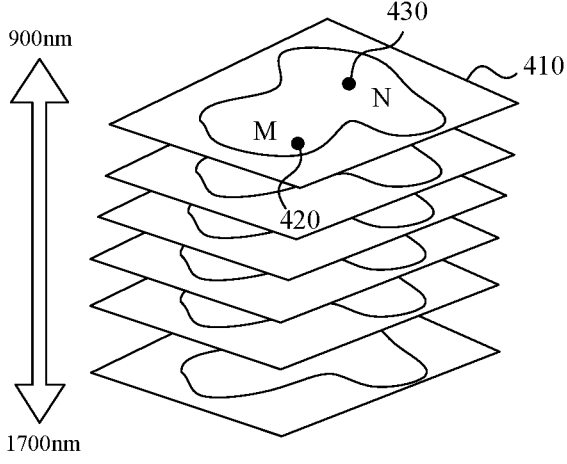
FIG. 4 is a schematic diagram of a sample image within a preset optical waveband according to an exemplary embodiment of this disclosure.

As shown in FIG. 3, the sample 340 is illuminated with the linear light source 330 and image-captured by using the short-wave-infrared hyperspectral camera 320 at different wavelengths to acquire multiple sample images at different wavelengths. As shown in FIG. 4, multiple sample images 410 taken by the short-wave-infrared hyperspectral camera 320 are arranged from top to bottom according to the wavelength range of 900 nm to 1700 nm, and are three-dimensional hyperspectral images with spectral information.

Figure 5:
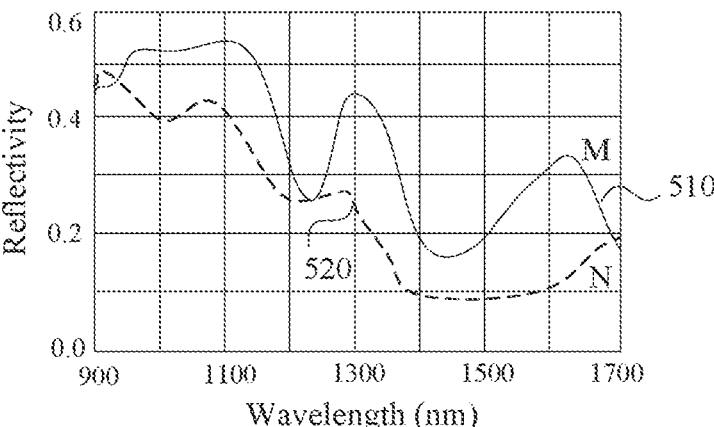
FIG. 5 is a spectral feature curve chart corresponding to a sample image according to an exemplary embodiment of this disclosure.

Exemplarily, as shown in FIG. 5, point M 420 and point N 430 are arbitrarily selected from the sample image 410, and a spectral characteristic curve 510 corresponding to point M 420 and a spectral characteristic curve 520 corresponding to point N 430 are obtained based on the spectral information corresponding to the sample image 410. The spectral characteristic curve chart is used for indicating a relationship between the light reflectivity and wavelengths, the horizontal axis represents the wavelengths, the vertical axis represents the reflectivity, and the reflectivity is used for indicating a ratio of a luminous flux reflected by the sample to a luminous flux incident on the sample. In an implementation, the spectral characteristic curve in FIG. 5 is a curve obtained after reflectivity correction.

In an implementation, at least one wavelength is determined from the preset optical waveband by using a tunable filter; and a push-broom acquisition operation is performed on the sample based on the acquisition device to acquire a sample image corresponding to the at least one wavelength.

In an implementation, a liquid crystal tunable filter (LCTF) is added in front of the hyperspectral camera and is configured to select a wavelength from the lighting source covering the preset optical waveband, so that a wavelength can be rapidly selected from the visible optical band or the near-infrared band without causing oscillations. For example, the lighting source covers a waveband of 900 nm to 1700 nm, light emitted by the lighting source passes through the liquid crystal tunable filter, and light with a wavelength of 1130 nm is obtained. That is, the liquid crystal tunable filter filters out light with other wavelengths within the preset optical waveband except the wavelength of 1130 nm.

In an implementation, the acquisition device is the hyperspectral camera that is a camera with a built-in grating push-broom structure and is configured to perform a push-broom acquisition operation on the sample according to an arrangement mode of gratings to obtain a sample image. Or, a hyperspectral shooting mode of the hyperspectral camera is to perform push-broom shooting with an external push-broom structure, such as a mobile sample bench 310 shown in FIG. 3. It is worthwhile to note that the above are merely illustrative examples, and are not intended to limit the embodiments of this disclosure.

In some embodiments, a lens of the hyperspectral camera may be a zoom lens, that is, a lens that adjusts field of view through optical zoom. In an implementation, visual field matching is performed by a physical lifting optical support, and a sample image is acquired; or, a sample image is acquired by using the zoom lens in combination with the lifting support.

Step 220: Acquire a first image, corresponding to at least one preset wavelength within the preset optical waveband, from the sample image to obtain a pseudo-color image.

Exemplarily, the sample image is multiple images obtained by image-capturing the sample, and a wavelength corresponding to the sample image is within the preset optical waveband. At least one preset wavelength is selected from multiple wavelengths within the preset optical waveband, and a sample image corresponding to the preset wavelength is taken as the first image, and finally the pseudo-color image is obtained.

In an implementation, for one preset length, there is at least one sample image corresponding to the preset wavelength. Exemplarily, when the selected preset wavelength corresponds to multiple sample images, one sample image may be selected from the multiple sample images and taken as the first image corresponding to the preset wavelength, or, the multiple images may be analyzed together to determine the first image corresponding to the preset wavelength.

Or, for one preset wavelength, there is one sample image corresponding to the preset wavelength, and the sample image is taken as the first image. In an implementation, a case where one preset wavelength corresponds to one first image is taken as an example, and ways of processing the first image vary according to a quantity of selected preset wavelengths. Exemplarily, a case where one wavelength is selected and a case where multiple wavelengths are selected are respectively analyzed.

(1) Selection of One Preset Wavelength

In an implementation, the first image corresponding to one preset wavelength within the preset optical waveband is colorated to obtain a pseudo-color image.

Exemplarily, the preset optical waveband is a waveband of 900 nm to 1700 nm that is selected from the near-infrared band. Because the preset optical waveband is an invisible waveband, the image corresponding to the waveband is a grayscale image. One preset wavelength is selected from the preset optical waveband, the first image corresponding to the preset wavelength is a grayscale image, and the grayscale image is colorated to obtain a pseudo-color image.

The pseudo-color image processing is used for indicating a technical process of converting a black-and-white grayscale image to a color image, which improves the recognizability of image content. Exemplarily, the pseudo-color image processing is performed by a grayscale division method, a grayscale transformation method, or the like.

In an implementation, the grayscale image is a single-channel image, that is, each pixel has only one value to represent color, the pixel value is between 0 and 255, 0 is used for indicating black, 255 is used for indicating white, and intermediate values are different levels of gray. Or, when the grayscale image is a three-channel image, pixel values of three channels are the same.

In an implementation, an image contrary to the single-channel image includes the three-channel image, that is, each pixel has 3 values. Exemplarily, an RGB image is a three-channel image, and various colors are obtained by changing channels of three colors, that is, red (R), green (G), and blue (B), and mutually superimposing the three colors. Each pixel is represented by three values.

Figure 6:
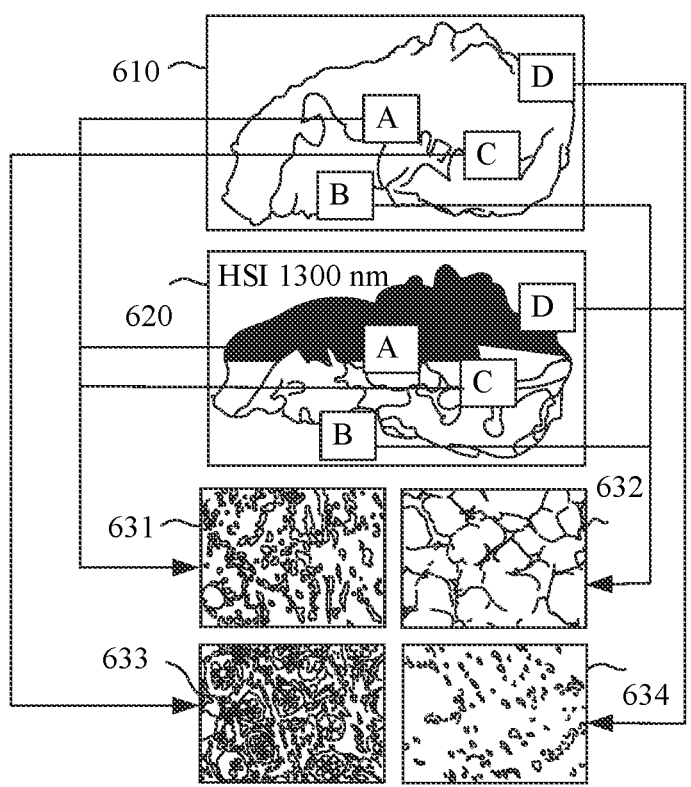
FIG. 6 is a schematic diagram of image processing of a sample according to an exemplary embodiment of this disclosure.

Exemplarily, the sample is a surgically resected pathological sample, and as shown in FIG. 6, the sample is subjected to image processing in different manners. Image 610 is used for indicating the sample (for ease of representation, the image is taken by using a conventional camera); image 620 is used for indicating a hyperspectral image corresponding to a wavelength of 1300 nm; and image 631 to image 634 are used for indicating observed appearances of tissued stained with hematoxylin and eosin, 631 is used for indicating a cancer tissue (represented by point A in image 610 or image 620), 632 is used for indicating an adipose tissue (represented by point B in image 610 or image 620), image 633 is used for indicating a normal mucosal tissue (represented by point C in image 610 or image 620), and image 634 is used for indicating a muscle tissue (represented by point D in image 610 or image 620).

Exemplarily, the wavelength of 1300 nm is taken as the selected preset wavelength, the hyperspectral image corresponding to image 620 is taken as the first image corresponding to the preset wavelength, and the first image is colorated by the foregoing method to obtain a pseudo-color image.

(2) Selection of Multiple Preset Wavelengths

Exemplarily, according to at least two preset wavelengths, at least two first images respectively corresponding to the at least two preset wavelengths are determined. An $i^{th}$ preset wavelength corresponds to an $i^{th}$ first image, and i is a positive integer.

In an implementation, the at least two first images corresponding to the at least two preset wavelengths within the preset optical waveband are synthesized, and the synthesized image is colorated to obtain a pseudo-color image.

Exemplarily, at least two preset wavelengths are selected from the preset optical waveband, and each preset wavelength corresponds to one first image. In an implementation, the at least two first images are synthesized to obtain a candidate image.

Exemplarily, a method for synthesizing multiple first images include at least one of the following methods.

(1) Pixel Value Processing

In an implementation, first pixel values of corresponding pixels of the at least two first images are averaged to obtain a second pixel value of the corresponding pixels; and the candidate image is determined according to the second pixel values corresponding to the pixels.

Exemplarily, after the at least two first images corresponding to the at least two preset wavelengths are obtained, the first pixel values of the corresponding pixels of the at least two first images are summed and then averaged to obtain the second pixel value of the corresponding pixels. That is, the second pixel value is an average value obtained by synthetically analyzing the first pixel values of the corresponding pixels of different first image. In an implementation, after the second pixel values corresponding to the pixels are determined, the candidate image is obtained according to position information of the pixels, and pixel values of pixels in the candidate image are the corresponding second pixel values.

In an implementation, during synthesis of the first images respectively corresponding to different preset wavelengths, with the help of the first pixel values of the corresponding pixels of different first images, the second pixel values obtained by averaging the multiple first pixel values are taken as pixel values of corresponding pixels in a second image, so that comprehensive equalization can be performed on the multiple different first images with the help of the corresponding pixels in the images, and equalization levels of different first image are reflected better.

(2) Software Processing

In an implementation, after the first image corresponding to the preset wavelength is determined, the at least two first images are synthesized by using software to obtain a candidate image.

Exemplarily, the at least two first images are inputted into Photoshop and subjected to operations, such as alignment, splicing and color correction, seam erasure, and exportation, to obtain the candidate image obtained by synthesizing the at least two first images.

The above are merely illustrative examples, and are not intended to limit the embodiments of this disclosure. In an implementation, when the selected preset wavelength is implemented as multiple preset wavelengths within the preset optical waveband, first images respectively corresponding to different preset wavelengths are synthetically analyzed, that is, the first images respectively corresponding to different preset wavelengths are synthesized by the foregoing synthesis method, which can analyze the sample more comprehensively from multiple wavelength dimensions. A candidate image is analyzed according to the first image respectively corresponding to the multiple wavelengths, so that the candidate image contains sample information common to the multiple wavelengths, an image difference caused by a wavelength difference is smoothed, and the limitation of the analysis is avoided.

Exemplarily, brightness classification is performed on pixels in the candidate image based on brightness values of the pixels in the candidate image, and at least two brightness levels are determined; and the at least two brightness levels are respectively colorated to obtain a pseudo-color image.

In an implementation, the first images are grayscale images, the candidate image obtained by synthesizing the first images is a grayscale image, and second pixel values corresponding to the pixels in the grayscale image are used for indicating the brightness of the candidate image. Exemplarily, the second pixel values are between 0 to 255, 0 is used for indicating black (the minimum brightness), and 255 is used for indicating white (the maximum brightness), that is, the smaller the numerical value of the second pixel value is, the lower the brightness is; and the larger the numerical value of the second pixel value is, the higher the brightness is.

Figure 7:
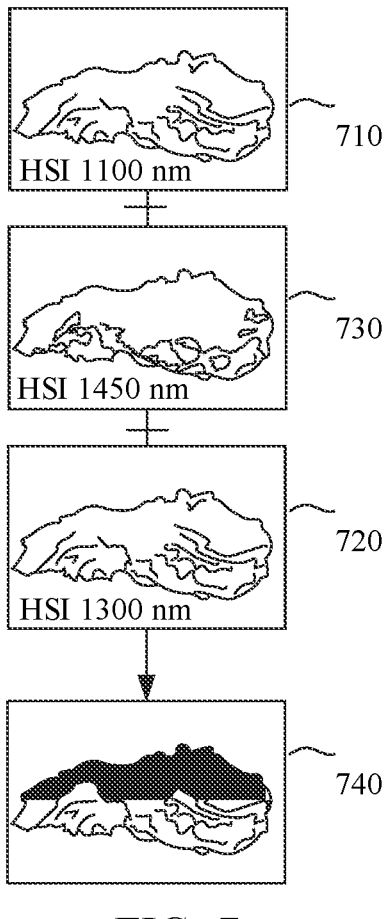
FIG. 7 is a schematic diagram of a synthesized pseudo-color image according to an exemplary embodiment of this disclosure.

Exemplarily, as shown in FIG. 7, first images corresponding to three preset wavelengths (a wavelength of 1100 nm, a wavelength of 1300 nm, and a wavelength of 1450 nm) are synthesized and colorated to obtain a pseudo-color image.

Image 710 is used for indicating a hyperspectral image corresponding to the wavelength of 1100 nm; image 720 is used for indicating a hyperspectral image corresponding to the wavelength of 1300 nm; and image 730 is used for indicating a hyperspectral image corresponding to the wavelength of 1450 nm. In an implementation, the foregoing hyperspectral images corresponding to the three preset wavelengths are synthesized and colorated to obtain a pseudo-color image represented by image 740.

Exemplarily, after the first image corresponding to one preset wavelength or the candidate image synthesized based on the first images respectively corresponding to the multiple preset wavelengths is obtained, brightness classification is performed on the pixels in the first image or the candidate image according to the brightness values of the pixels in the first image or the candidate image, and at least two brightness levels are determined, so that different brightness levels are respectively colorated to obtain the pseudo-color image. Through the foregoing coloration, with the help of brightness variation of the pixels in the image, the pixels corresponding to different brightness levels are colorated, so that the colorated pseudo-color image is more in line with the observation habit of human eyes, and it is convenient for a professional to distinguish different image regions through different colors in the pseudo-color image.

Step 230: Perform region division on the sample image according to a difference in sample element types in the sample image to obtain a region division result.

The sample element types include a recognition element type.

In an implementation, the sample element type is used for indicating a sample property difference corresponding to different sample regions in the sample image. Exemplarily, when the sample image is an image obtained by image-capturing a pathological sample, and the sample element types include: a tumor tissue in the pathological sample, an adipose tissue in the pathological sample, a mucosal tissue in the pathological sample, a muscle tissue in the pathological sample, and the like; and when the sample image is an image obtained by image-capturing a chemical mixture (including compound A, compound B, and impurities), the sample element types include: compound A, compound B, and impurities.

Exemplarily, when the sample image is a pathological image obtained by image-capturing a pathological sample, the recognition element type is a pre-determined tumor tissue (one of sample element types corresponding to the pathological image); or, the recognition element type is a pre-determined adipose tissue. In an implementation, when the sample image is a chemical image obtained by image-capturing a chemical mixture, the recognition element type is pre-determined compound B (one of sample element types corresponding to the chemical image), or the like.

Exemplarily, the sample image is an image with spectral information, and the spectral information varies according to a property difference in different substances. Region division is performed on the sample image to obtain a region division result.

Exemplarily, the spectral information presents differently on the sample image. For example, when the sample image is a grayscale image, sample element A corresponds to a region with the darkest color, the sample element corresponds to a region with the lightest color, and a region division result is obtained based on the sample element types.

In an implementation, for ease of distinguishing, different regions may be filled with different colors to obtain a region division result with colors; or, different regions are divided with darker contour lines to obtain a region division result with obvious separation lines.

It is worthwhile to note that the above are merely illustrative examples, and are not intended to limit the embodiments of this disclosure.

Step 240: Determine an image region including the recognition element type from the sample image based on the pseudo-color image and the region division result.

Exemplarily, the pseudo-color image is an image obtained by processing the first image corresponding to the preset wavelength; and the region division result is a result of region division performed according to the sample element types in the sample image. In an implementation, the pseudo-color image is divided according to different colors. For example, the sample image is an image obtained by image-capturing a pathological sample, and in the sample image, a tumor tissue appears orange, an adipose tissue appears bright yellow, a mucosa tissue appears light orange that is lighter than the color of the tumor tissue, and a muscle tissue appears dark orange that is darker than the color of the tumor tissue.

In an implementation, an overlapping region of the pseudo-color image and the region division result is determined; and in the sample image, the overlapping region is taken as the image region including the recognition element type.

Exemplarily, the sample is a pathological sample, a sample image with spectral information is obtained by image-capturing the pathological sample, and in order to observe a tumor tissue in the sample image, and the foregoing processing is performed on the sample image to obtain a pseudo-color image corresponding to a selected preset wavelength and a region division result of the sample image. According to a region of the tumor tissue determined from the pseudo-color image and a recognition result of the recognition element type (the tumor tissue) in the region division result, the overlapping region is taken as the image region including the recognition element type (tumor tissue), so as to realize the process of recognition of the tumor tissue region.

Exemplarily, after obtaining the pseudo-color image of the first image corresponds to a first wavelength with a good spectral effect and the region division result obtained after performing region division on the sample image, the sample image is analyzed more comprehensively with reference to the pseudo-color image obtained by coloration and a spectral analysis result, so that the image region including the recognition element type contains image information expressed by the pseudo-color image, and also includes the spectral information represented by the region division result. Therefore, the accuracy of the determined image region is fully improved.

The above are merely illustrative examples, and are not intended to limit the embodiments of this disclosure.

Base on the above, a first image corresponding to a preset wavelength is acquired from a sample image, and a pseudo-color image is obtained, a region division result is obtained after performing region division on the sample image, and an image region is determined with reference to the pseudo-color image and the region division result. By the foregoing method, a situation where a size, a region, and the like of a tumor tissue are determined by a doctor by visual observation and interpretation only may be avoided. A sample is image-captured based on a preset optical waveband that is determined in advance to obtain a sample image, at least one preset wavelength with a good effect is selected from the preset optical waveband, and a first image corresponding to the preset wavelength is determined from the sample image according to the at least one preset wavelength and processed to obtain a pseudo-color image that can reflect an advantage of the preset wavelength accurately. Region division is performed on the sample image according to a difference in sample element types in the sample image to obtain a region division result. An image region including a recognition element type is determined with reference to the pseudo-color image and the region division result, so as to determine position information of a region to be recognized (such as a tumor tissue), which improves the accuracy of pathological sampling and reduces the difficulty of pathological sampling. Analysis of spectral characteristics corresponding to the sample at different wavelengths is easy to operate and low in cost, so it is easy to widely apply.

Figure 8:
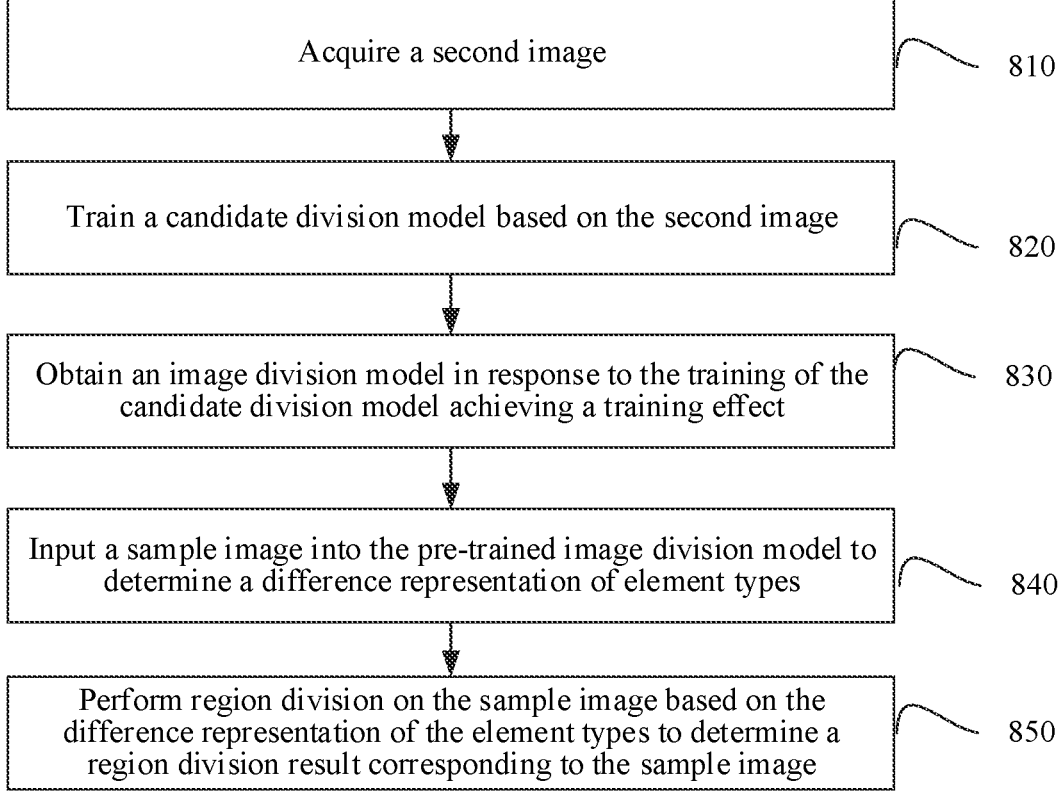
FIG. 8 is a flowchart of an image processing method according to another exemplary embodiment of this disclosure.

In an implementation, the process of performing region division on the sample image is determined by different spectral information corresponding to different sample element types. Exemplarily, as shown in FIG. 8, step 230 in the foregoing embodiment shown in FIG. 2 may also be implemented as the following step 810 to step 850.

Step 810: Acquire a second image.

The second image is a pre-labeled image with spectral information that is obtained by image-capturing a sample.

In an implementation, the sample image and the second image are images obtained by image-capturing the sample, and when the sample is image-captured, a golden standard of the sample image is determined, that is, the second image is determined. The golden standard is used for indicating a currently accepted reliable method for diagnosing disease in the clinical medical field.

Figure 9:
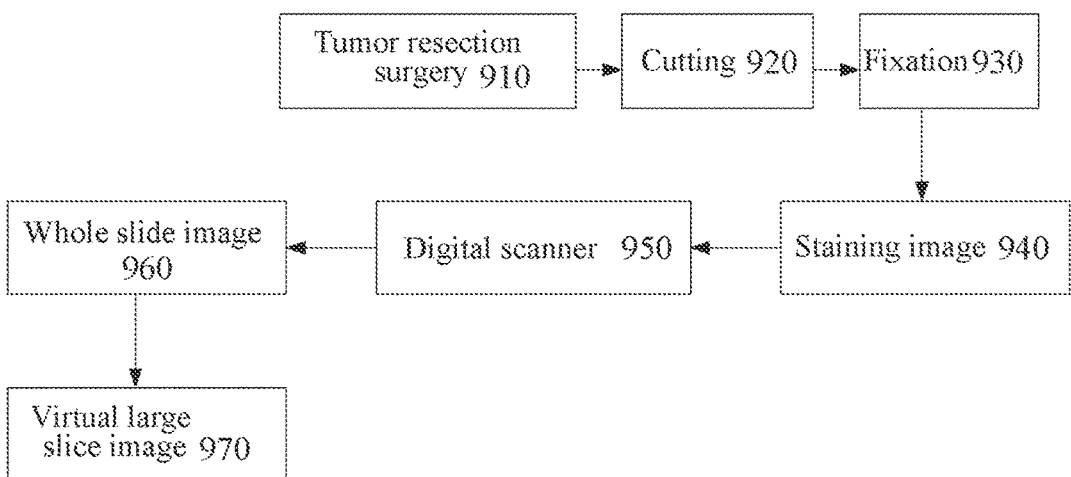
FIG. 9 is a schematic diagram of sampling of a pathological sample according to another exemplary embodiment of this disclosure.

In an implementation, the sample is a surgically resected pathological sample. Exemplarily, as shown in FIG. 9, the pathological sample is sampled. Firstly, a doctor performs a tumor resection surgery 910 to resect a pathological sample (including a tumor tissue) of a patient, then performs cutting 920 on the pathological sample to obtain a tissue mass with an appropriate volume, and performing fixation 930 on the tissue mass by formalin immersion or the like. For example, within 30 minutes after surgical resection of the ex vivo pathological sample, the tissue mass is placed into a sufficient amount of 3.7% neutral formalin solution for fixation, and the fixation time is 12-48 h. Subsequently, tissue slices with a thickness of 5±1 mm (an average thick is about 5 mm) are cut from the fixed tissue mass, including a tumor tissue and a surrounding normal tissue of 1-2 cm. In an implementation, the tissue mass obtained after fixing the pathological sample may be taken as the sample, or the tissue slice obtained after slicing the tissue mass may be taken as the sample.

In an implementation, after the sample is acquired, the tissue slice is processed by general sampling, conventional dehydration, embedding and HE staining to obtain a staining image 940, and the staining image 940 is scanned by using a digital scanner 950 to obtain multiple whole slide images (WSIs) 960. The WSIs are images of the pathology sample that are taken under the digital scanner 950 (a motorized microscope structure). Exemplarily, if a size of a single WSI is small, an analyzed WSI may be obtained by splicing multiple pathological slices. For example, multiple WSI fragments are spliced by using WSI splicing software and restored to obtain a virtual large slice image 970.

In an implementation, the virtual large slice image 970 is labeled by using an advanced system analysis program (ASAP) as a golden standard to obtain multiple labeled WSIs that are obtained by scanning the pathological sample. The labeling may be performed in a manner of labeling regions, and labeled regions include a region where one or more focuses are located, and further include a special region with a prompt function Exemplarily, in a hollow organ, a tumor tissue is labeled in red, normal mucosa is labeled in green, an adipose tissue is labeled in yellow, and a muscle tissue is labeled in blue; and in a parenchymal organ, a tumor tissue is labeled in red, a normal tissue is labeled in green, an adipose tissue is labeled in yellow, and the like. In an implementation, the foregoing color labeling is merely an illustrative example, and different colors may be used to label selected tissues. For example, when a mammary gland tissue in the parenchymal organ is labeled, a tumor tissue in the mammary gland tissue is labeled in red, an adipose tissue is labeled in yellow, a fibrous connective tissue is labeled in green, and the like. In an implementation, when there is no tissue corresponding to the color in an observed organ, the organ may not be labeled. For example, when a parenchymal organ is labeled by the foregoing color labeling method, if there is no adipose tissue in the observed organ, the organ is not labeled in yellow. Exemplarily, the labeled WSI is taken as the second image, so as to realize the process of acquiring the second image.

Step 820: Train a candidate division model based on the second image.

The candidate division model is an untrained model with a certain region division function. Exemplarily, the candidate division model is trained by taking the second image as a golden standard, and the candidate division model learns during training with a large number of second images to gradually automatically recognize a special region, such as a focus region, and gradually have a region division function.

Step 830: Obtain an image division model in response to the training of the candidate division model achieving a training effect.

The image division model is configured to perform region division on the first image. Exemplarily, in the process of training the candidate division model, the image division model is obtained because the training of the candidate division model reaches a training target. In an implementation, the training effect of the candidate division model is determined according to a loss value, and the training target includes at least one of the following cases.

1. In response to the loss value reaching a convergence state, a candidate division model obtained during the last iterative training is taken as the image division model.

Exemplarily, the loss value reaching a convergence state is used for indicating that a numerical value of the loss value obtained according to a loss function no longer changes or has a change with a range less than a preset threshold. For example, a loss value corresponding to an $n^{th}$ second image is 0.1, a loss value corresponding to a $(n+1)^{th}$ second image is also 0.1, and it can be considered that the loss value reaches a convergence state. A candidate division model adjusted according to the loss value corresponding to the $n^{th}$ second image or the $(n+1)^{th}$ second image as the image division model, so as to realize the process of training the candidate division model.

2. In response to the number of acquisitions of the loss value reaching a number threshold, a candidate division model obtained during the latest iterative training is taken as the image division model.

Exemplarily, one loss value may be obtained during one acquisition, and the number of acquisitions of the loss value for training the image division model is preset. When one second image corresponds to one loss value, the number of acquisitions of the loss value is the number of second images; or, when one second image corresponds to multiple loss values, the number of acquisitions of the loss value is the number of loss values. For example, it is preset that one loss value may be obtained during one acquisition, and the number threshold of acquisitions of the loss value is 10, that is, when the number threshold of acquisitions is reached, a candidate division model adjusted according to the last loss value is taken as the image division model, or a candidate division model adjusted according to the minimum loss value during 10 adjustments with the loss value is taken as the image division model, so as to realize the process of training the candidate division model.

It is worthwhile to note that the above are merely illustrative examples, and are not intended to limit the embodiments of this disclosure.

In an implementation, a deep learning network involved in the candidate division model may be a deep learning network such as a convolutional network for biomedical image segmentation (U-net), a generative adversarial network (GAN), and a convolutional neural network (CNN). The deep learning network is a policy for region segmentation.

In an implementation, machine learning algorithms, such as principal component analysis (PCA), other than deep learning may also be used; or, other non-machine learning algorithms, such as a support vector machine (SVM), a maximum likelihood method, a spectral angle, spectral information divergence, a Mahalanobis distance, are used.

Exemplarily, by labeling a pathological region in a pathological sample, a second image that can represent the currently accepted golden standard for diagnosing diseases in the clinical medical field is obtained. The second image can more accurately represent a pathological position corresponding to the pathological sample, so that the candidate division model is trained accurately, the robustness of the candidate division model is gradually improved, and an image division model meeting a training effect is obtained.

Step 840: Input a sample image into the pre-trained image division model to determine a difference representation of element types.

In an implementation, after being subjected to image pre-processing, the sample image inputted into the pre-trained image division model.

Figure 10:
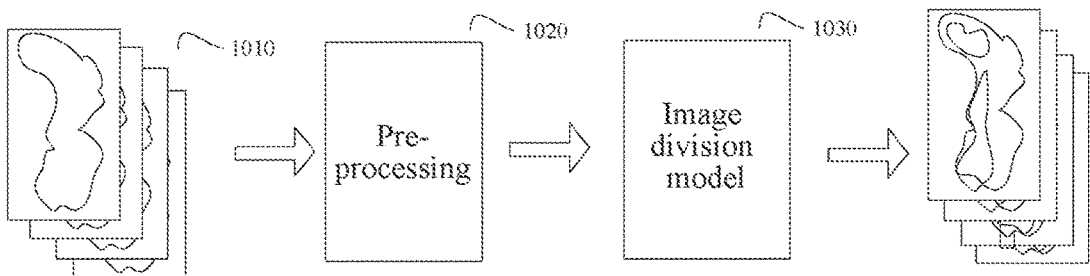
FIG. 10 is a flowchart of region division of a sample image according to an exemplary embodiment of this disclosure.

Exemplarily, as shown in FIG. 10, after being acquired, multiple sample images 1010 are subjected to pre-processing 1020. The process of performing image pre-processing 1020 on the sample images includes at least one of the following: a geometric transformation operation, an image enhancement operation, and the like (such as image background correction, registration, and denoising) are performed on the sample images to highlight important features in the sample images. Then, the pre-processed sample images 1010 are inputted into an image division model 1030 that is obtained by pre-training, and region division is performed on the sample images based on the image division model 1030.

In an implementation, the sample image is an image with spectral information, and spectral analysis is performed on the sample image to obtain a spectral analysis result; and a difference representation of element types corresponding to the sample image is determined based on the spectral analysis result.

Different spectral analysis results corresponding to different sample images according to a difference in samples corresponding to the sample images. Exemplarily, the spectral analysis result is represented in the form of a spectral feature curve chart, the horizontal axis of the spectral feature curve chart represents wavelengths, the vertical axis represents the reflectivity, and different spectral curves are used for indicating reflectivity changes of different samples at different wavelengths, that is, the spectral analysis results.

In an implementation, after analysis of hyperspectral images of 62 tissues of different systems, it is preliminarily determined that a wavelength for distinguishing a tumor tissue from a normal tissue in different organs is within a range of 1296-1308 nm (this wavelength range has a good effect). Exemplarily, a hollow organ (such as an esophagus, a stomach, and a colorectum), a kidney, a mammary gland, and a lung that include a tumor tissue are taken as samples for analysis, and sample images corresponding to the hollow organs, the kidney, the mammary gland, and the lung are obtained. The sample images are three-dimensional hyperspectral images, and spectral feature curve charts respectively corresponding to the hollow organ, the kidney, the mammary gland, and the lung are obtained according to data corresponding to the three-dimensional hyperspectral images.

Figure 11:
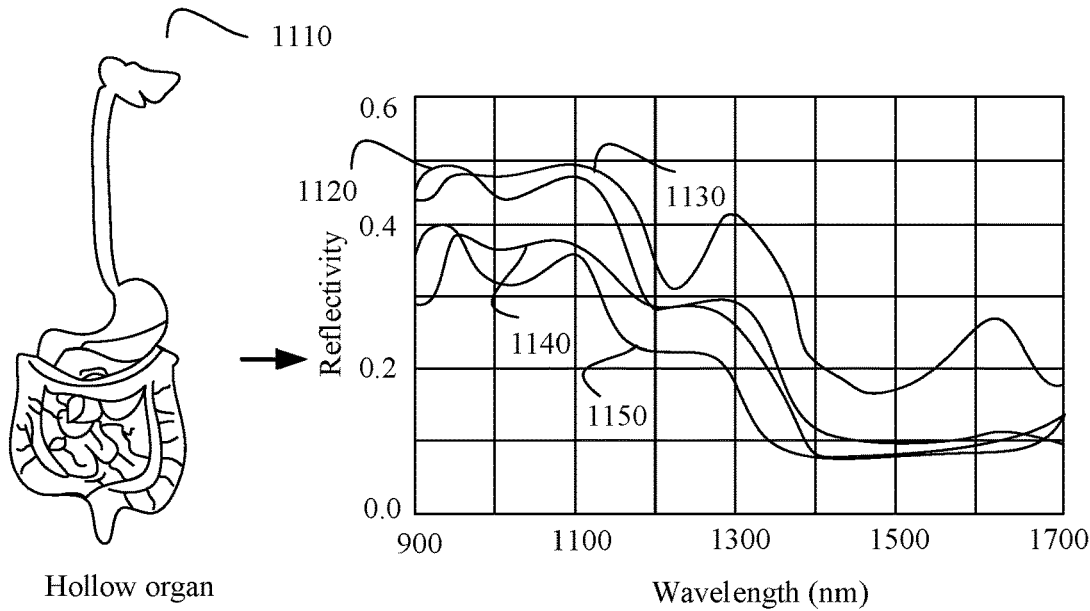
FIG. 11 is a spectral feature curve chart corresponding to a hollow organ according to an exemplary embodiment of this disclosure.

As shown in FIG. 11, which is a spectral feature curve chart corresponding to a hollow organ 1110, and in the figure, a wavelength curve corresponding to a tumor tissue (a cancer tissue) is a tumor wavelength curve 1120; a wavelength curve corresponding to an adipose tissue is an adipose wavelength curve 1130; a wavelength curve corresponding to normal mucosa is a mucosa wavelength curve 1140; and a wavelength curve corresponding to a muscle tissue is a muscle wavelength curve 1150.

Figure 12:
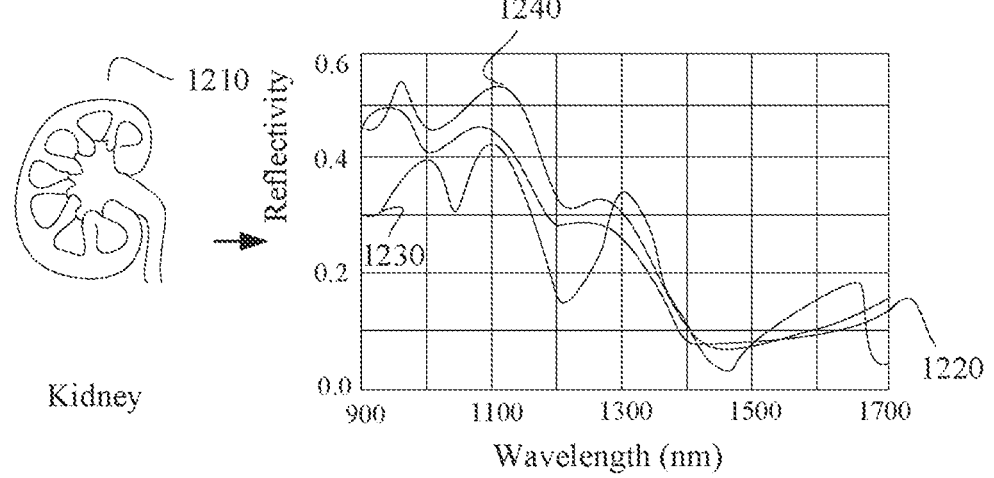
FIG. 12 is a spectral feature curve chart corresponding to a kidney according to an exemplary embodiment of this disclosure.

As shown in FIG. 12, which is a spectral feature curve chart corresponding to a kidney 1210, and in the figure, a wavelength curve corresponding to a tumor tissue (a cancer tissue) is a tumor wavelength curve 1220; a wavelength curve corresponding to an adipose tissue is an adipose wavelength curve 1230; and a wavelength curve corresponding to normal mucosa is a mucosa wavelength curve 1240.

Figure 13:
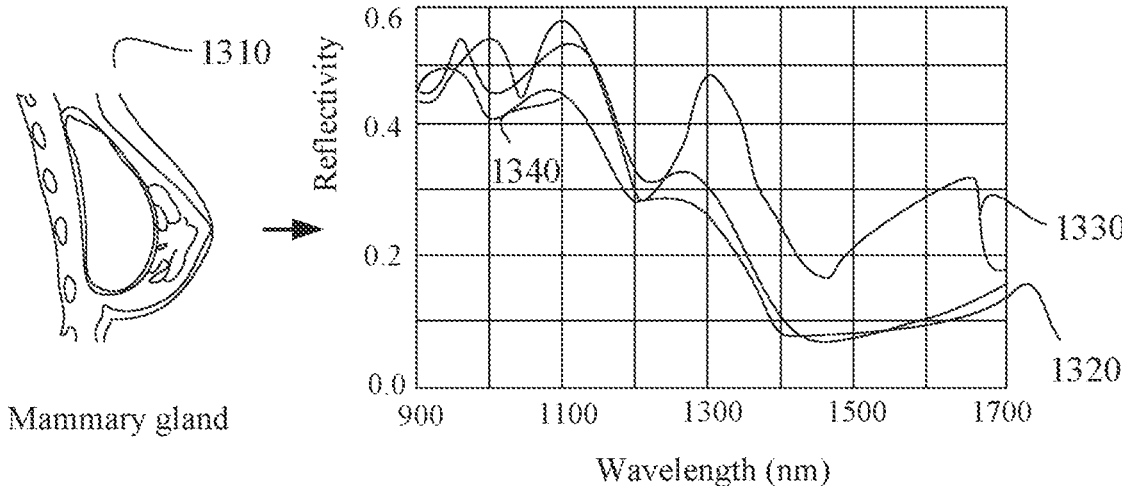
FIG. 13 is a spectral feature curve chart corresponding to mammary gland according to an exemplary embodiment of this disclosure.

As shown in FIG. 13, which is a spectral feature curve chart corresponding to a mammary gland 1310, and in the figure, a wavelength curve corresponding to a tumor tissue (a cancer tissue) is a tumor wavelength curve 1320; a wavelength curve corresponding to an adipose tissue is an adipose wavelength curve 1330; and a wavelength curve corresponding to normal mucosa is a mucosa wavelength curve 1340.

Figure 14:
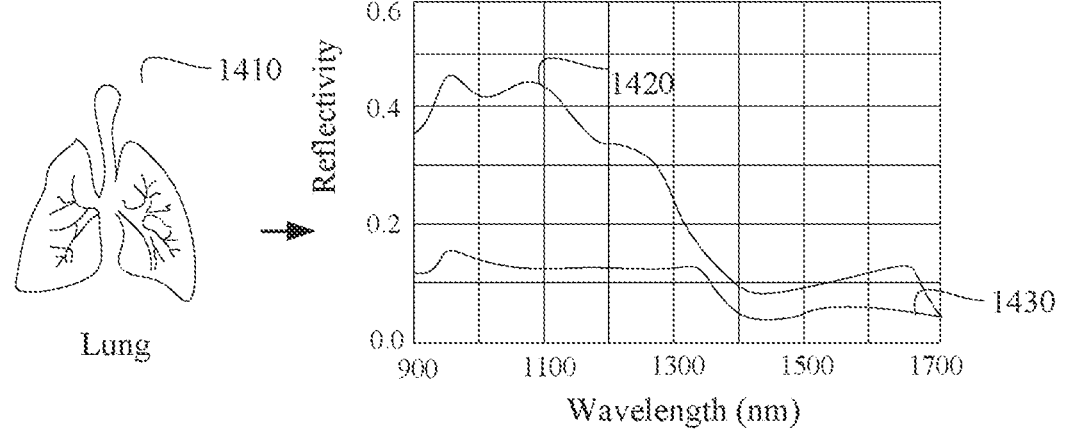
FIG. 14 is a spectral feature curve chart corresponding to a lung according to an exemplary embodiment of this disclosure.

As shown in FIG. 14, which is a spectral feature curve chart corresponding to the lung 1410, and in the figure, a wavelength curve corresponding to a tumor tissue (a cancer tissue) is a tumor wavelength curve 1420; and a wavelength curve corresponding to a normal lung is a normal wavelength curve 1430.

A difference representation of element types corresponding to the sample image is a difference in different tissues. For example, the tumor tissue and an adipose tissue are different. The above are merely illustrative examples, and are not intended to limit the embodiments of this disclosure.

An analysis is performed with reference to FIG. 11 to FIG. 14, and it can be known that when the wavelength is about 1300 nm, different tissues in the sample of the hollow organ tissue show good discrimination. The tumor tissues and the surrounding normal tissues, as well as the adipose tissue in the parenchymal organs (such as the mammary gland, the kidney, and the lung) also show good discrimination.

Exemplarily, colon cancer is taken as an example, it is observed with the naked eye that in a hyperspectral image corresponding to the wavelength of 1300 nm, a tumor tissue is gray, a normal muscle tissue is darker gray-black than the tumor tissue, an adipose tissue is gray-white, normal mucosa is dark gray that is lighter than the muscle tissue and darker than the tumor tissue. The hyperspectral image corresponding to the wavelength of 1300 nm shows good discrimination of the adipose tissue, the muscle tissue, and the tumor tissue.

In an implementation, three peaks and troughs, that is, 1100 nm, 1300 nm, and 1450 nm, in the hyperspectral image are extracted as a feature waveband to synthesize a short-wave-infrared color composite image, so as to provide a pseudo-color image more in line with the observation habit of human eyes, so that it is convenient for a doctor to recognize different tissues. In the short-wave-infrared color composite images, the cancer tissue appears orange, the muscle tissue appears darker orange than the tumor tissue, normal mucosa appears lighter orange than the cancer tissue, and the adipose tissue appears bright yellow.

Exemplarily, spectral analysis is performed on the sample image based on the spectral information in the sample image, so as to use a spectral analysis result corresponding to the sample image to more intuitively determine reflectivity changes of the sample at different wavelengths, and thus determine a difference in different tissues, which facilitates region analysis of the sample image based on the difference.

Step 850: Perform region division on the sample image based on the difference representation of the element types to determine a region division result corresponding to the sample image.

Exemplarily, after the spectral analysis result is obtained, a corresponding region information prompt is given on the sample image by the image division model, and the region information prompt includes at least one of the following prompts.

(1) Contour Line Prompt

Exemplarily, different regions in the sample image are divided with contour lines to obtain different divided regions, the contour lines may be dark curves or curves with a color.

(2) Thermodynamic Chart Prompt

Exemplarily, a region where a tumor tissue is located is represented in a special highlighting manner.

(3) Single Color Filling Prompt

Figure 15:
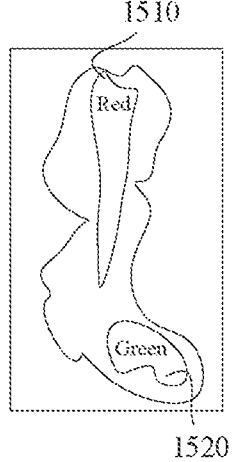
FIG. 15 is a schematic diagram of a single color filling prompt according to an exemplary embodiment of this disclosure.

Exemplarily, as shown in FIG. 15, different regions are distinguished by filling with different colors. For example, a tumor tissue region is filled with red 1510, and an adipose tissue region is filled with green 1520. In an implementation, a region that cannot be accurately divided is filled with white or is not filled.

Figure 16:
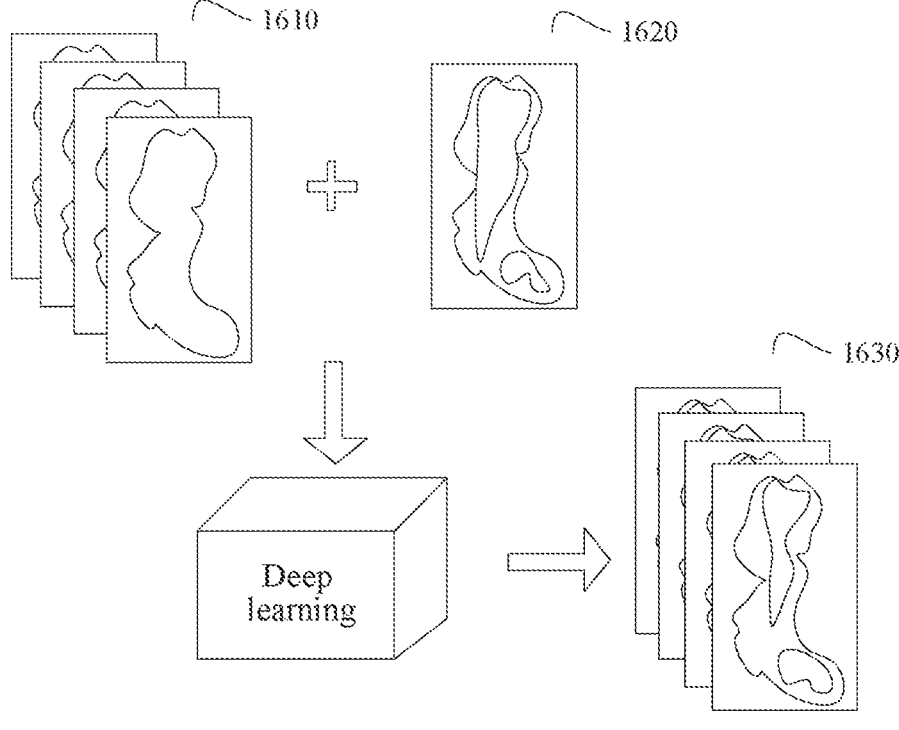
FIG. 16 is a flowchart of obtaining of a prediction result according to an exemplary embodiment of this disclosure.

In an implementation, as shown in FIG. 16, deep learning is performed based on a short-wave-infrared hyperspectral image 1610 (a sample image) and a labeled WSI 1620 to finally obtain a prediction result 1630 obtained after prediction of the short-wave-infrared hyperspectral image 1610, and schematically. Exemplarily, the prediction result 1630 is prompted by filling with a single color. The above are merely illustrative examples, and are not intended to limit the embodiments of this disclosure.

Exemplarily, after the difference representation of the element types is determined with the help of the image division model, region division is performed on the sample image by fully utilizing the reflectivity changes of the sample at different wavelengths that are indicated by the difference representation of the element types to determine the region division result corresponding to the sample image within the preset optical waveband, and an analysis dimension of the sample image is refined in the form of regions, which is conducive to improvement of the analysis accuracy of the sample image.

Based on the above, a sample is image-captured based on a preset optical waveband that is determined in advance to obtain a sample image, at least one preset wavelength with a good effect is selected from the preset optical waveband, and a first image corresponding to the preset wavelength is determined from the sample image according to the at least one preset wavelength and processed to obtain a pseudo-color image that can reflect an advantage of the preset wavelength accurately. Region division is performed on the sample image according to a difference in sample element types in the sample image to obtain a region division result. An image region including a recognition element type is determined with reference to the pseudo-color image and the region division result, so as to determine position information of a region to be recognized (such as a tumor tissue). By the foregoing method, a situation where a size, a region, and the like of a tumor tissue are determined by a doctor by visual observation and interpretation only may be avoided, the difficulty of pathological sampling is reduced, and the operation is simple and low in cost.

In the embodiments of this disclosure, a training process and an application process of a region division model are described. During training of the region division model, a WSI is taken as a second image, an untrained candidate division model is trained based on the second image until a convergence condition is satisfied to obtain an image division model, region division is performed on a sample image through the image division model, and a region division result corresponding to the sample image is determined according to a difference representation of element types in the sample image. By the foregoing method, a focus region of a resected tissue is learned through the model, a special region, such as the focus region, is automatically recognized through the model, and an image region is specially labeled with a region information prompt on an image outputted by the model, so that the image is analyzed better with the help of the model, and the accuracy of pathological sampling is improved.

In an implementation, the foregoing image processing method is applied to the medical field for processing pathological images. After pathological images with infrared hyperspectral information corresponding to different sites are acquired, focus regions of resected tissues are predicted with reference narrow-band synthesized pseudo-color images and deep learning, so that a new solution is provided for intraoperative tumor margin determination and postoperative auxiliary pathological sampling. Exemplarily, the foregoing image processing method is applied to the following at least two recognition processes: (I) recognition of a tumor tissue of a hollow organ; and (II) recognition of a tumor tissue of a parenchymal organ.

(I) Recognition of a Tumor Tissue of a Hollow Organ

A hollow organ refers to an organ with a lumen shape and a large space inside the organ, such as stomach, intestine, bladder, and gallbladder. A parenchymal organ is contrary to the hollow organ, which includes heart, lung, kidney, liver, spleen, and the like. A difference is that the former is solid and the latter is hollow. Exemplarily, abdominal parenchymal organs include liver, spleen, kidney, adrenal gland, pancreas, and the like; and abdominal hollow organs include gallbladder, stomach, duodenum, jejunum, ileum, appendix, colon, and the like.

In an implementation, a colon cancer tissue, a rectal cancer tissue, a stomach cancer tissue, and an esophageal cancer tissue in the hollow organs are studied. Among the four different tumor tissues, HSIs corresponding to 1300 nm show good discrimination and have similar imaging colors.

Compared with X-ray images, hyperspectral imaging has a greater advantage in recognition of the muscular layer of the hollow organ. During determination of a tumor boundary, the hyperspectral image is obviously clearer than a conventional color image. A color image synthesized from HSIs corresponding to 1100 nm, 1300 nm, and 1450 nm can clearly show a range of the tumor tissue, and different tissues appears varying intensities of color from yellow to orange.

Figure 17:
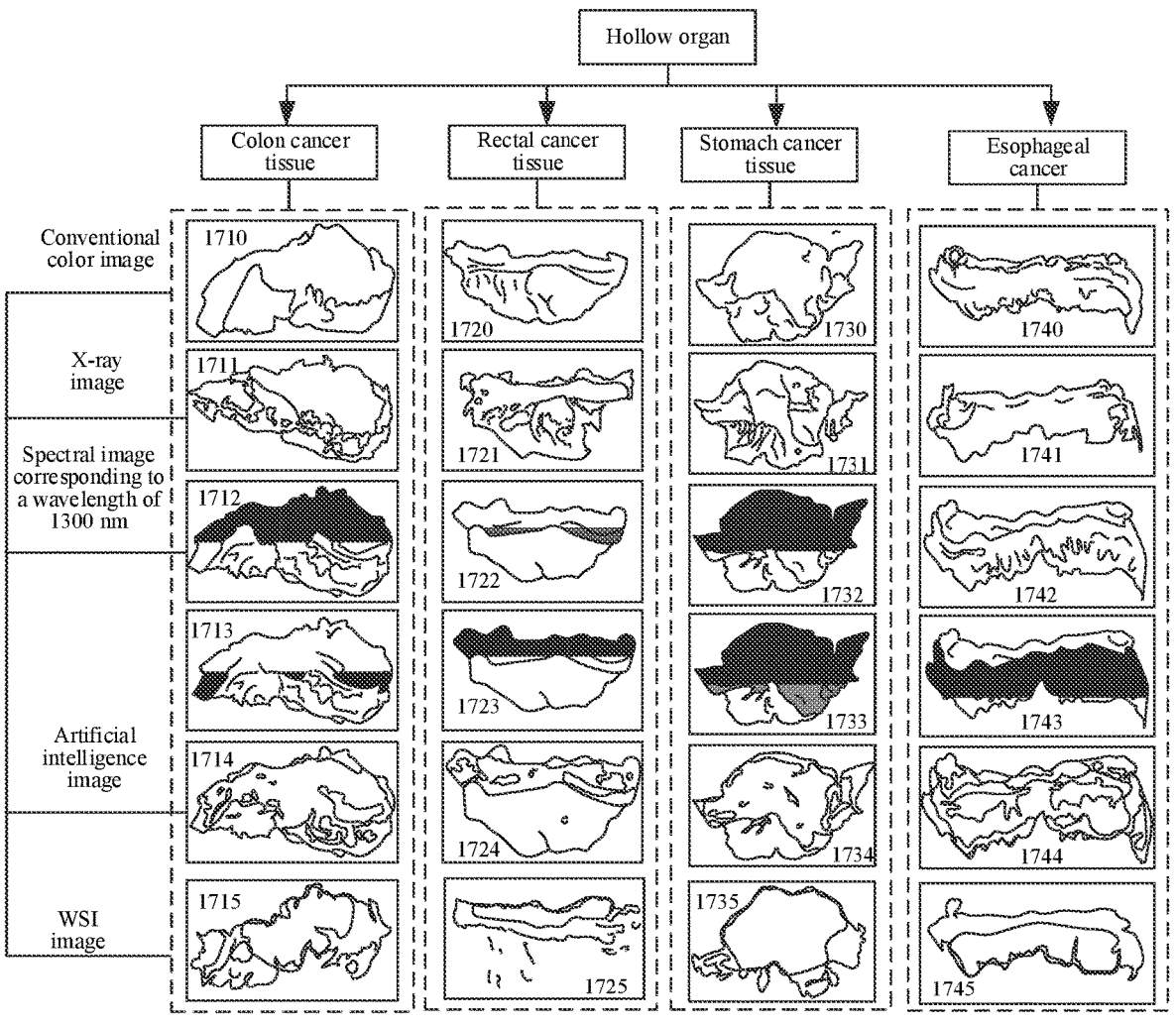
FIG. 17 is a schematic diagram of 4 tissue classification image representations according to an exemplary embodiment of this disclosure.

Exemplarily, as shown in FIG. 17, classified image representations of four tissues selected from the hollow organs are shown. Sample 1 is a colon cancer tissue, sample 2 is a rectal cancer tissue, sample 3 is a stomach cancer tissue, and sample 4 is an esophageal cancer tissue.

Image 1710 to image 1740 shown in the first row are used for indicating conventional color images (equivalent to visual observation) taken by an ordinary camera.

Image 1711 to image 1741 shown in the second row are used for indicating X-ray images obtained by using an X-ray device, an approximate contour of a tumor region can be shown, an effect is not clear, and the muscular layer structure cannot be distinguished.

Image 1712 to image 1742 shown in the third line are used for indicating hyperspectral images (HSI 1300 nm) corresponding to a wavelength of 1300 nm that are taken by using a hyperspectral camera, the hyperspectral images are grayscale images, and different tissues show different shades of color, which can be identified by the naked eye.

Image 1713 to image 1743 shown in the fourth row are used for indicating pseudo-color images synthesized from hyperspectral images corresponding to a wavelength of 1100 nm, the hyperspectral images corresponding to the wavelength of 1300 nm, and hyperspectral images corresponding to a wavelength of 1450 nm.

Image 1714 to image 1744 shown on the fifth line are used for indicating artificial intelligence segmented images, such as images outputted by the foregoing region division model, which can provide more detailed sampling information. For example, color A represents a tumor tissue, color B represents a muscular tissue, color C represents a normal mucosa tissue, and color D represents an adipose tissue. In an implementation, the darker the color is, the higher the confidence is.

Image 1715 to image 1745 shown on the sixth row are used for indicating WSIs (golden standards) and used for showing a true range of a tumor tissue.

(II) Recognition of a Tumor Tissue of a Parenchymal Organ

Figure 18:
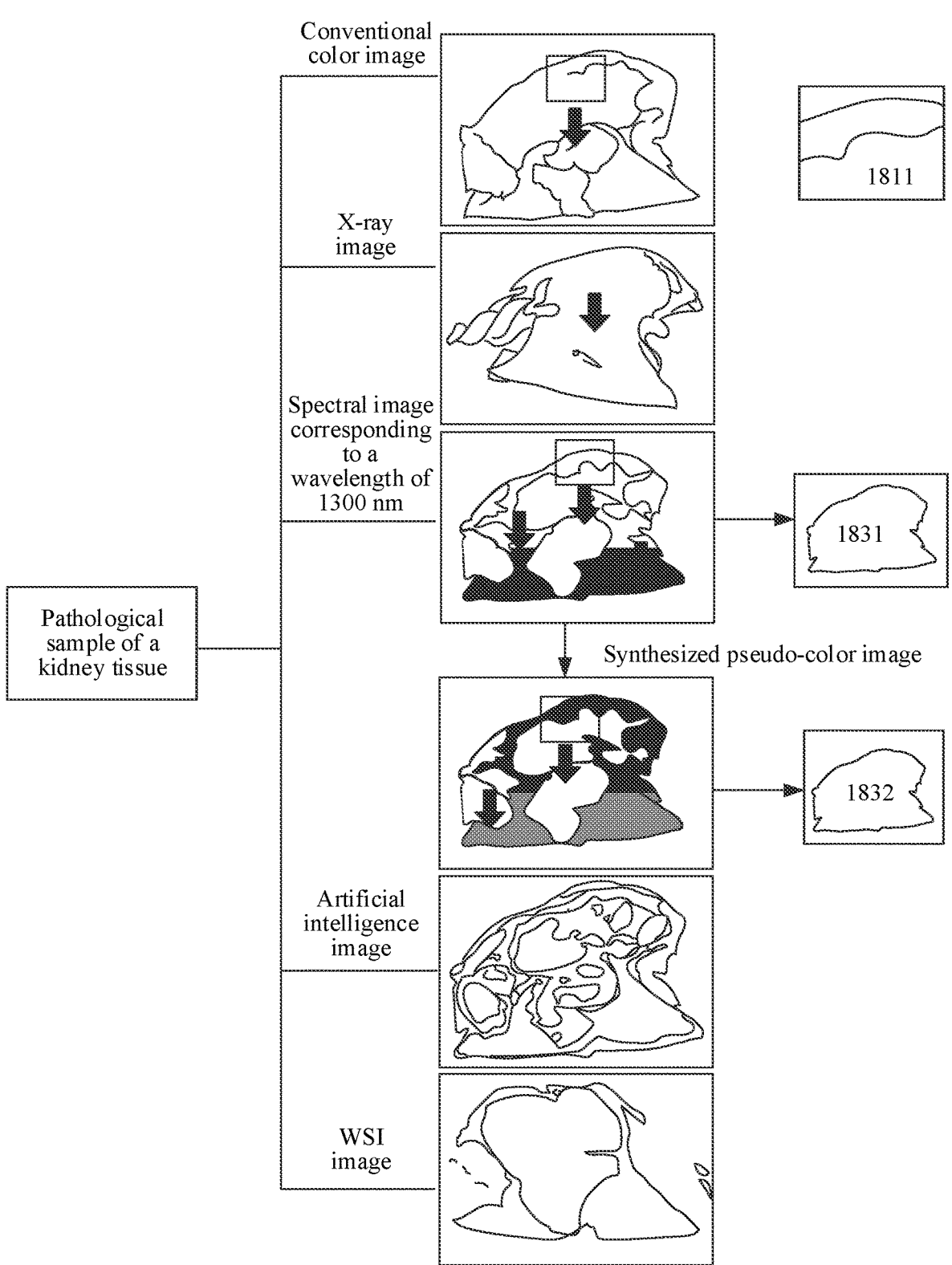
FIG. 18 is a schematic diagram of different image representations of kidney cancer according to an exemplary embodiment of this disclosure.

In an implementation, a kidney, a lung, and a mammary gland that are parenchymal organs and have focuses (such as a tumor tissue) are studied. For a sample with a large tumor tissue, visual recognition is possible. Exemplarily, as shown in FIG. 18, different image representations of kidney cancer are shown.

Image 1810 is used for indicating a conventional color image (visual observation) of a kidney tissue, and in the conventional color image, a tumor tissue appears off-white, an adipose tissue appears yellow, and a normal kidney tissue appears light brown. Image 1811 is used for indicating a diagram of a tumor boundary after magnification of the conventional color image. A boundary between the tumor tissue and the normal kidney tissue shown in the magnified image is not easily distinguished.

Image 1820 is used for indicating an X-ray image taken by using an X-ray device. Although the X-ray image can show a contour of the tumor, the boundary is not clear, so it is impossible to distinguish the normal kidney tissue from the tumor tissue.

Image 1830 is used for indicating a hyperspectral image corresponding to a wavelength of 1300 nm. Image 1831 is used for indicating a diagram of the tumor boundary after magnification of the hyperspectral image corresponding to the wavelength of 1300 nm. In the hyperspectral image corresponding to the wavelength of 1300 nm, the tumor tissue appears off-white, the normal kidney tissue appears gray, and the adipose tissue appears bright off-white. In the magnified image, there is a clear boundary between the tumor tissue and the surrounding normal tissue.

Image 1840 is used for indicating a pseudo-color image. Image 1832 is used for indicating a diagram of the tumor boundary after magnification of the pseudo-color image.

Exemplarily, the pseudo-color image may be obtained by colorating one hyperspectral image corresponding to one wavelength, or by synthesizing multiple hyperspectral images corresponding to multiple wavelengths and then colorating. The wavelengths may be randomly selected or pre-determined. Exemplarily, it is determined according to the experimental results that at least one wavelength with a good effect is pre-selected, and a pseudo-color image is obtained according to a hyperspectral image corresponding to the at least one wavelength.

For example, a wavelength of 1300 nm that has a good effect is pre-selected, and a hyperspectral image corresponding to the wavelength of 1300 nm is colorated to obtain a pseudo-color image; or, a wavelength of 1250 nm is randomly selected, and a hyperspectral image corresponding to the wavelength of 1250 nm is colorated to obtain a pseudo-color image; or, three wavelengths of 1300 nm, 1100 nm, and 1450 nm that have a good effect are pre-selected, and hyperspectral images corresponding to the three wavelengths are synthesized and colorated to obtain a pseudo-color image.

In the short-wave-infrared synthesized color image, the renal cancer tissue appears orange, the adipose tissue appears bright yellow, and the normal kidney tissue region appears darker orange. In the magnified image, the boundary between the tumor tissue and the surrounding tissue is clear and easy to distinguish.

Image 1850 is used for indicating an artificial intelligence segmented image, which used for region division of the sample image. Exemplarily, different regions are represented in different forms for distinction. For example, the tumor tissue appears red, the normal kidney tissue appears green, and the adipose tissue appears yellow, and a darker color represents higher confidence. In the artificial intelligence segmented image, red represents the tumor tissue, green represents the normal kidney tissue, yellow represents the adipose tissue, a darker color represents higher confidence, and the contour of the tumor is more consistent with a tumor boundary in a WSI.

Image 1860 is used for indicating a contour of the tumor region in the WSI.

Figure 19:
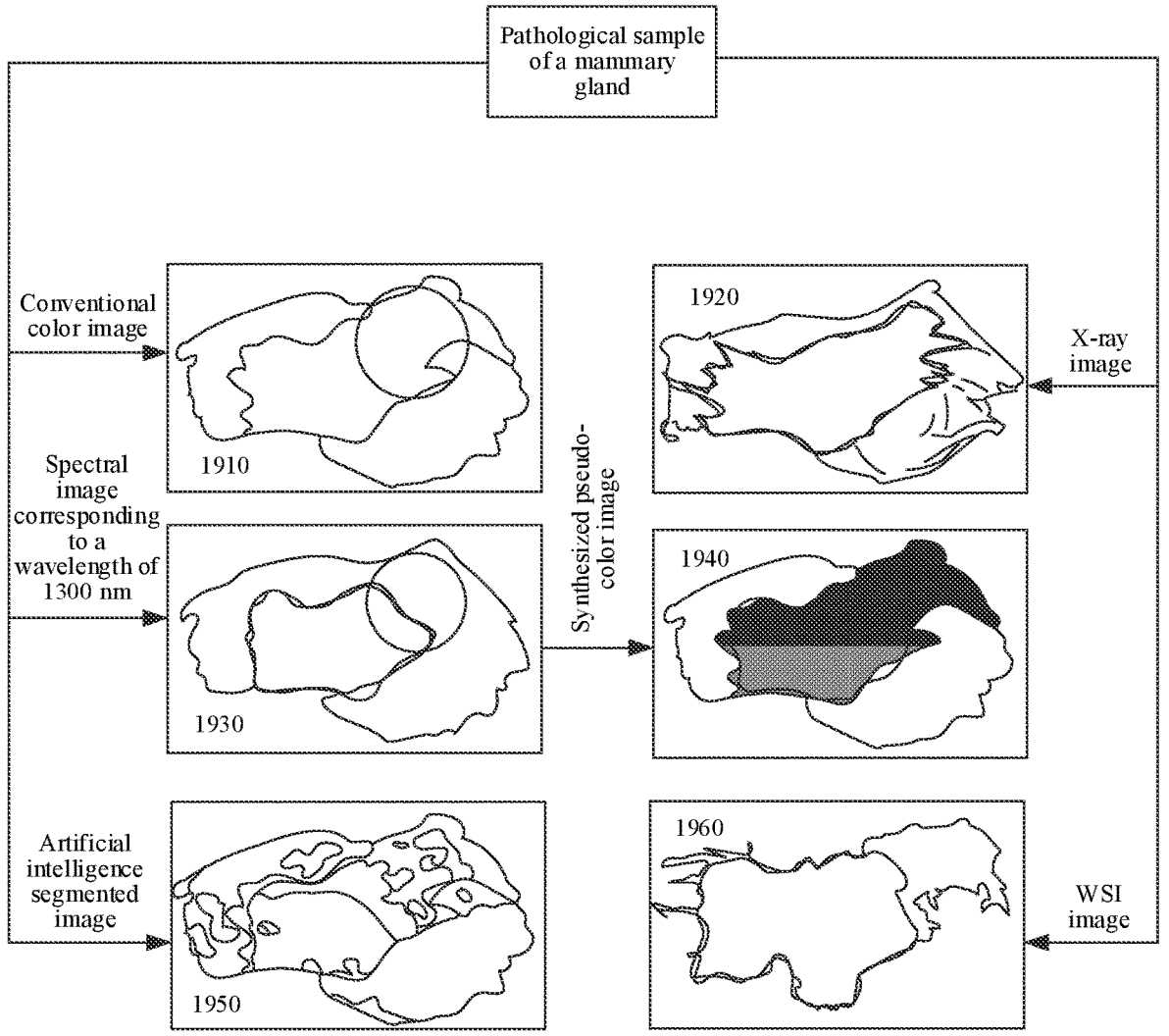
FIG. 19 is a schematic diagram of different image representations of a mammary gland according to an exemplary embodiment of this disclosure.

In an implementation, the description is made by taking a mammary gland in the parenchymal organs as an example. It seems that it is not easy to determine a boundary of a tumor with the naked eye. For example, a boundary of a tumor tissue cannot be accurately recognized through a photo taken by using an ordinary camera. As shown in FIG. 19, image 1910 is used for indicating a conventional color image taken by using an ordinary camera, and in the image, a circled part is a boundary part of a tumor tissue, and a boundary between the tumor tissue within the part and a surrounding tissue cannot be clearly distinguished in the conventional color image.

An X-ray image has a good effect in determining a tumor tissue, and has been used as a main auxiliary tool in pathological sampling to help pathologists find a range of a tumor bed. Image 1920 is used for indicating an X-ray image taken by using an X-ray device, and in the shown case, a tumor contour shown in the X-ray image has a burr-like edge and has an obviously larger range compared to a tumor contour shown in a WSI.

Image 1930 is used for indicating a hyperspectral image corresponding to a wavelength of 1300 nm, and in the image, the tumor tissue appears dark gray (a part corresponding to an irregular shape), and a surrounding normal mammary gland tissue appears light gray in a circle.

Image 1940 is used for indicating a pseudo-color image determined according to a hyperspectral image corresponding to at least one selected wavelength. Exemplarily, in the short-wave infrared synthesized pseudo-color image, a region of the tumor tissue appears darker orange compared to the surrounding mammary gland tissue, and the adipose tissue appears bright yellow.

Image 1950 is used for indicating an artificial intelligence segmented image (a processing result of the sample image that is obtained through a deep learning model), which provides an accurate information reference for the tumor tissue range. Image 1960 is used for indicating a WSI (a golden standard).

Figure 20:
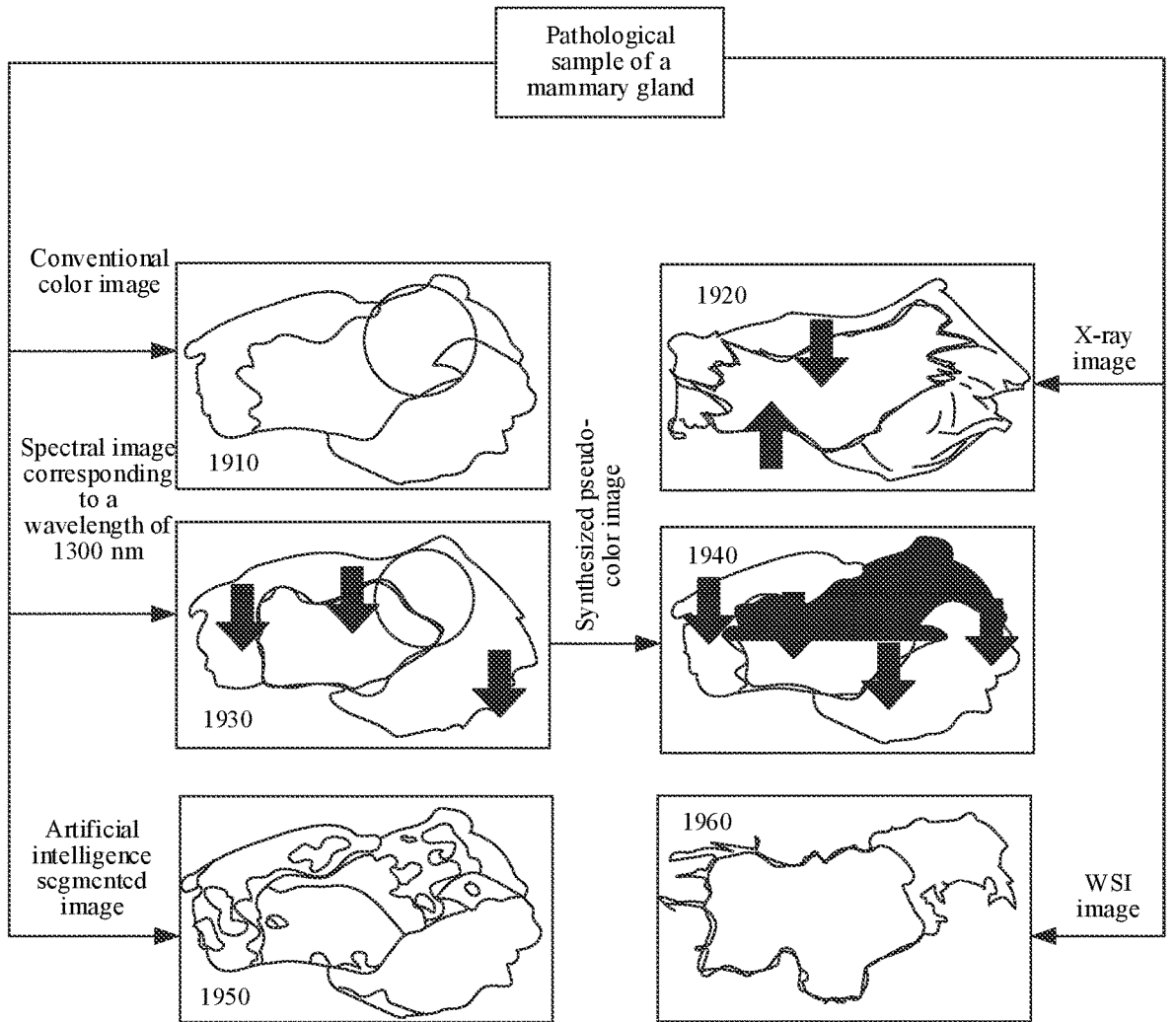
FIG. 20 is a schematic diagram of different image representations of a mammary gland according to another exemplary embodiment of this disclosure.

In an implementation, in the mammary gland case, the X-ray image obtained by using the X-ray device may show punctate calcifications. Exemplarily, as shown in FIG. 20, image 2010 is used for indicating a conventional color image taken by using an ordinary camera, and a tumor region appears off-white, and an approximate range of a tumor tissue can be distinguished. Image 2020 is used for indicating an X-ray image taken by using an X-ray device, The X-ray image may roughly show an edge of the tumor tissue that is burr-like, and punctate calcifications (at positions indicated by arrows in image 2020) are visible in the tumor tissue. Image 2030 is used for indicating a hyperspectral image corresponding to a wavelength of 1300 nm, and in the image, the tumor tissue appears dark gray, the normal mammary gland tissue appears lighter gray compared to the region of the tumor tissue, and the adipose tissue appears off-white. Image 2040 is used for indicating a short-wave-infrared color image obtained by processing a hyperspectral image corresponding to the foregoing selected at least one wavelength, which can show a clearer tumor contour. Image 2050 is used for indicating an artificially segmented image. Image 2060 is used for indicating a WSI that is taken as a golden standard. Exemplarily, an image region is determined with reference to the short-wave-infrared color image and the artificially segmented image, and a contour shown by the image region has the best agreement with the golden standard (the WSI).

Based on the above, a sample is image-captured based on a preset optical waveband that is determined in advance to obtain a sample image, at least one preset wavelength with a good effect is selected from the preset optical waveband, and a first image corresponding to the preset wavelength is determined from the sample image according to the at least one preset wavelength and processed to obtain a pseudo-color image that can reflect an advantage of the preset wavelength accurately. Region division is performed on the sample image according to a difference in sample element types in the sample image to obtain a region division result. An image region including a recognition element type is determined with reference to the pseudo-color image and the region division result, so as to determine position information of a region to be recognized (such as a tumor tissue). By the foregoing method, a situation where a size, a region, and the like of a tumor tissue are determined by a doctor by visual observation and interpretation only may be avoided, the difficulty of pathological sampling is reduced, and the operation is simple and low in cost.

In the embodiments of this disclosure, the foregoing image processing method is applied to the medical field for analyzing hollow organs and parenchymal organs to determine benefits of the foregoing image processing method. On the one hand, the foregoing image processing method is more reliable compared to visual observation and hand touching of doctors, and the consistency of images is more guaranteed. On the other hand, a hyperspectral shooting system has the characteristics of no damage, no contact, and no ionizing radiation, and the hardware system cost of the hyperspectral shooting system is lower than that of an X-ray device.

Figure 21:
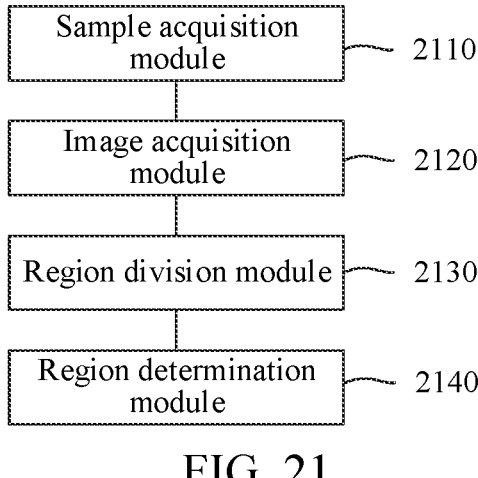
FIG. 21 is a structural block diagram of an image processing apparatus according to an exemplary embodiment of this disclosure.

FIG. 21 is a structural block diagram of an image processing apparatus according to an exemplary embodiment of this disclosure. As shown in FIG. 21, the apparatus includes:

a sample acquisition module 2110, configured to acquire a sample image, the sample image including an image obtained by image-capturing a sample within a preset optical waveband;

an image acquisition module 2120, configured to acquire a first image corresponding to at least one preset wavelength within the preset optical waveband from the sample image to obtain a pseudo-color image;

a region division module 2130, configured to perform region division on the sample image according to a difference in sample element types in the sample image to obtain a region division result, the sample element types including a recognition element type; and a region determination module 2140, configured to image region including the recognition element type from the sample image based on the pseudo-color image and the region division result.

In an implementation, the image acquisition module 2120 is further configured to colorate the first image corresponding to the preset wavelength within the preset optical waveband to obtain the pseudo-color image; or, synthesize at least two first images corresponding to at least two preset wavelengths within the preset optical waveband, and colorate a synthesized image to obtain the pseudo-color image.

In an implementation, the image acquisition module 2120 is further configured to determine, according to the at least two preset wavelengths, the at least two first images respectively corresponding to the at least two preset wavelengths, an $i^{th}$ preset wavelength corresponding to an $i^{th}$ first image, and i being a positive integer; synthesize the at least two first images to obtain a candidate image; and colorate the candidate image to obtain the pseudo-color image.

In an implementation, the image acquisition module 2120 is further configured to average pixel values of corresponding pixels of the at least two first images to obtain a second pixel value of the corresponding pixels; and determining the candidate image based on the second pixel values corresponding to the pixels.

In an implementation, the image acquisition module 2120 is further configured to perform brightness classification on pixels in the candidate image based on brightness values of the pixels in the candidate image, and determine at least two brightness levels; and respectively colorate the at least two brightness levels to obtain the pseudo-color image.

Figure 22:
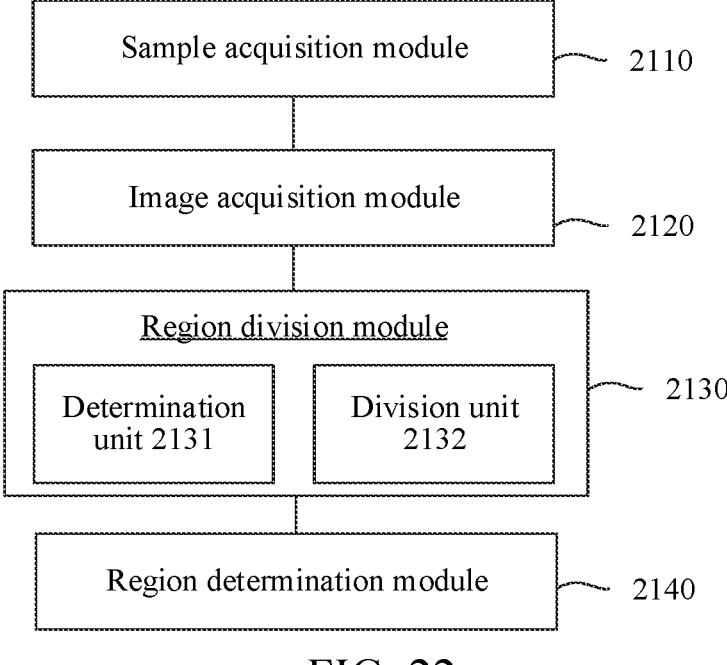
FIG. 22 is a structural block diagram of an image processing apparatus according to another exemplary embodiment of this disclosure.

As shown in FIG. 22, In an implementation, the region division module 2130 includes:

a determination unit 2131, configured to input the sample image into a pre-trained image division model to determine a difference representation of the element types; and a division unit 2132, configured to perform region division on the sample image based on the difference representation of the element types to determine the region division result corresponding to the sample image.

In an implementation, the sample image is an image with spectral information.

The determination unit 2131 is further configured to perform spectral analysis on the sample image to obtain a spectral analysis result; and determine the difference representation of the element types corresponding to the sample image based on the spectral analysis result.

In an implementation, the apparatus is further configured to acquire a second image, the second image being a pre-labeled image with spectral information that is obtained by image-capturing the sample; train a candidate division model based on the second image; and obtain an image division model in response to the training of the candidate division model achieving a training effect, the image division model being configured to perform region division on the first image.

In an implementation, the sample acquisition module 2110 is further configured to perform a push-broom acquisition operation on the sample to obtain the sample image.

In an implementation, the push-broom acquisition operation is performed based on an acquisition device, and the sample acquisition module 2110 is further configured to determine at least one wavelength from the preset optical waveband by using a tunable filter; and perform the push-broom acquisition operation on the sample based on the acquisition device to acquire a sample image corresponding to the at least one wavelength.

In an implementation, the region determination module 2140 is further configured to determine an overlapping region of the pseudo-color image and the region division result; and take, in the sample image, the overlapping region as the image region including the recognition element type.

Based on the above, a sample is image-captured based on a preset optical waveband that is determined in advance to obtain a sample image, at least one preset wavelength with a good effect is selected from the preset optical waveband, and a first image corresponding to the preset wavelength is determined from the sample image according to the at least one preset wavelength and processed to obtain a pseudo-color image that can reflect an advantage of the preset wavelength accurately. Region division is performed on the sample image according to a difference in sample element types in the sample image to obtain a region division result. An image region including a recognition element type is determined with reference to the pseudo-color image and the region division result, so as to determine position information of a region to be recognized (such as a tumor tissue). Through the foregoing apparatus, a situation where a size, a region, and the like of a tumor tissue are determined by a doctor by visual observation and interpretation only may be avoided, the difficulty of pathological sampling is reduced, and the operation is simple and low in cost.

The image processing apparatus according to the foregoing embodiments is illustrated with an example of division of the foregoing functional modules. In practical application, the foregoing functions may be allocated to and completed by different functional modules according to requirements, that is, an internal structure of a device is divided into different functional modules, so as to complete all or some of the foregoing functions. In addition, the image processing apparatus according to the foregoing embodiments belongs to the same idea as the image processing method embodiments, a specific implementation process may refer to the method embodiments, which is not described in detail here.

Figure 23:
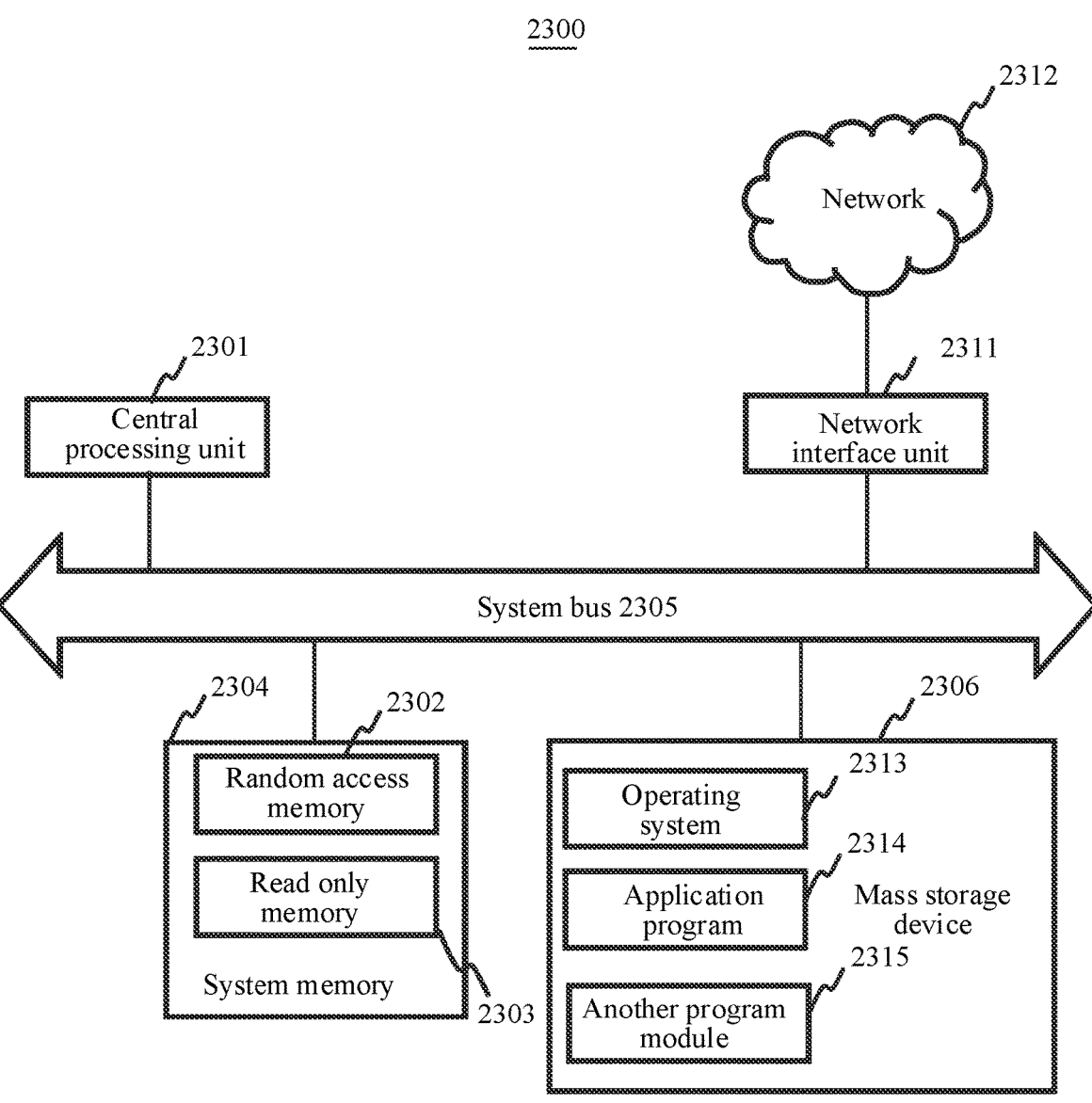
FIG. 23 is a schematic structural diagram of a server according to an exemplary embodiment of this disclosure.

FIG. 23 is a schematic structural diagram of a server according to an exemplary embodiment of this disclosure. The server 2300 includes a central processing unit (CPU) 2301, a system memory 2304 including a random access memory (RAM) 2302 and a read only memory (ROM) 2303, and a system bus 2305 connecting the system memory 2304 to the CPU 2301. The server 2300 further includes a mass storage device 2306 configured to store an operating system 2313, an application program 2314, and another program module 2315.

The mass storage device 2306 is connected to the CPU 2301 through a mass storage controller (not shown) connected to the system bus 2305. The mass storage device

2306 and a computer-readable medium associated with the mass storage device provide non-transitory storage for the server 2300.

Generally, the computer-readable medium may include a computer storage medium and a communication medium.

According to the embodiments of this disclosure, the server 2300 may be connected to a network 2312 through a network interface unit 2311 connected to the system bus 2305, or may be connected to a network of another type or a remote computer system (not shown) through the network interface unit 2311.

The memory further includes one or more programs, which are stored in the memory and are configured to be executed by the CPU.

The embodiments of this disclosure further provide a computer device, which includes a processor and a memory. The memory stores at least one instruction, at least one segment of program, a code set or an instruction set that, when loaded and executed by the processor, implements the image processing method according to the foregoing method embodiments.

The embodiments of this disclosure further provide a computer-readable storage medium, which stores at least one instruction, at least one segment of program, a code set or an instruction set that, when loaded and executed by a processor, implements the image processing method according to the foregoing method embodiments.

The embodiments of this disclosure further provide a computer program product or computer program, which includes a computer instruction. The computer instruction is stored in a computer-readable storage medium. A processor of a computer device reads the computer instruction from the computer-readable storage medium and executes the computer instruction to cause the computer device to perform the image processing method according to any one of the foregoing embodiments.

In an implementation, the computer-readable storage medium may include: a read only memory (ROM), a random access memory (RAM), a solid state drive (SSD), an optical disc, and the like. The RAM may include a resistance random access memory (ReRAM) and a dynamic random access memory (DRAM). The serial numbers of the foregoing embodiments of this disclosure are merely for description purpose but do not imply the preference among the embodiments.

What is claimed is:

1. An image processing method, comprising:
acquiring, with a processor circuitry, a sample image, the sample image comprising an image obtained by image-capturing a sample within a preset optical waveband;
processing, with the processor circuitry, a first image corresponding to at least one preset wavelength within the preset optical waveband in the sample image, to obtain a pseudo-color image, the processing the first image comprises colorating the first image corresponding to the preset wavelength within the preset optical waveband to obtain the pseudo-color image;
performing, with the processor circuitry, region division on the sample image according to a difference in sample element types in the sample image to obtain a region division result, the sample element types comprising a recognition element type;
determining, with the processor circuitry, an image region comprising the recognition element type from the sample image based on the pseudo-color image and the region division result; and performing, with the processor circuitry, a pathological sampling based on the determined image region.

2. The method according to claim 1, wherein the processing the first image to obtain the pseudo-color image comprises:
synthesizing at least two first images corresponding to at least two preset wavelengths within the preset optical waveband, to obtain a synthesized image; and
colorating the synthesized image to obtain the pseudo-color image.

3. The method according to claim 2, wherein the synthesizing the at least two first images corresponding to the at least two preset wavelengths within the preset optical waveband comprises:
determining, according to the at least two preset wavelengths, the at least two first images respectively corresponding to the at least two preset wavelengths, an $i^{th}$ preset wavelength corresponding to an $i^{th}$ first image, and i being a positive integer; and
synthesizing the at least two first images to obtain a candidate image; and
the colorating the synthesized image to obtain the pseudo-color image comprises:
colorating the candidate image to obtain the pseudo-color image.

4. The method according to claim 3, wherein the synthesizing the at least two first images to obtain the candidate image comprises:
averaging first pixel values of corresponding pixels of the at least two first images to obtain a second pixel value of the corresponding pixels; and
determining the candidate image based on the second pixel values.

5. The method according to claim 3, wherein the colorating the candidate image to obtain the pseudo-color image comprises:
performing brightness classification on pixels in the candidate image based on brightness values of the pixels in the candidate image;
determining at least two brightness levels; and
colorating the at least two brightness levels respectively to obtain the pseudo-color image.

6. The method according to claim 1, wherein the performing the region division on the sample image to obtain the region division result comprises:
inputting the sample image into a pre-trained image division model to determine a difference representation of the sample element types; and
performing region division on the sample image based on the difference representation of the sample element types to determine the region division result corresponding to the sample image.

7. The method according to claim 6, wherein the sample image is an image with spectral information, and the inputting the sample image into the pre-trained image division model to determine the difference representation of the sample element types comprises:
performing spectral analysis on the sample image to obtain a spectral analysis result; and
determining the difference representation of the sample element types corresponding to the sample image based on the spectral analysis result.

8. The method according to claim 7, further comprising:
acquiring a second image, the second image being a pre-labeled image with spectral information that is obtained by image-capturing the sample;

training a candidate division model based on the second image; and obtaining an image division model in response to the training of the candidate division model achieving a training effect, the image division model being configured to perform region division on the first image.

9. The method according to claim 1, wherein the acquiring the sample image comprises:

performing a push-broom acquisition operation on the sample to obtain the sample image.

10. The method according to claim 9, wherein the acquiring the sample image comprises:

determining, with a tunable filter, at least one preset wavelength from the preset optical waveband; and performing, with an acquisition device, the push-broom acquisition operation on the sample to acquire a sample image corresponding to the at least one preset wavelength.

11. The method according to claim 1, wherein the determining the image region comprising the recognition element type from the sample image based on the pseudo-color image and the region division result comprises:

determining an overlapping region of the pseudo-color image and the region division result; and taking, in the sample image, the overlapping region as the image region comprising the recognition element type.

12. An image processing apparatus, comprising:

a memory operable to store computer-readable instructions; and a processor circuitry operable to read the computer-readable instructions, the processor circuitry when executing the computer-readable instructions is configured to:

acquire a sample image, the sample image comprising an image obtained by image-capturing a sample within a preset optical waveband;

colorate a first image corresponding to at least one preset wavelength within the preset optical waveband in the sample image, to obtain a pseudo-color image;

perform region division on the sample image according to a difference in sample element types in the sample image to obtain a region division result, the sample element types comprising a recognition element type;

determine an image region comprising the recognition element type from the sample image based on the pseudo-color image and the region division result; and perform a pathological sampling based on the determined image region.

13. The apparatus according to claim 12, wherein the processor circuitry is configured to:

synthesize at least two first images corresponding to at least two preset wavelengths within the preset optical waveband, to obtain a synthesized image; and colorate the synthesized image to obtain the pseudo-color image.

14. The apparatus according to claim 13, wherein the processor circuitry is configured to:

determine, according to the at least two preset wavelengths, the at least two first images respectively corresponding to the at least two preset wavelengths, an $i^{th}$ preset wavelength corresponding to an $i^{th}$ first image, and i being a positive integer;

synthesize the at least two first images to obtain a candidate image; and colorate the candidate image to obtain the pseudo-color image.

15. The apparatus according to claim 12, wherein the processor circuitry is configured to:

input the sample image into a pre-trained image division model to determine a difference representation of the sample element types; and perform region division on the sample image based on the difference representation of the sample element types to determine the region division result corresponding to the sample image.

16. The apparatus according to claim 12, wherein the processor circuitry is configured to:

perform a push-broom acquisition operation on the sample to obtain the sample image.

17. The apparatus according to claim 12, wherein the processor circuitry is configured to:

determine an overlapping region of the pseudo-color image and the region division result; and take, in the sample image, the overlapping region as the image region comprising the recognition element type.

18. A non-transitory machine-readable media, having instructions stored on the machine-readable media, the instructions configured to, when executed, cause a machine to:

acquire a sample image, the sample image comprising an image obtained by image-capturing a sample within a preset optical waveband;

colorate a first image corresponding to at least one preset wavelength within the preset optical waveband in the sample image, to obtain a pseudo-color image;

perform region division on the sample image according to a difference in sample element types in the sample image to obtain a region division result, the sample element types comprising a recognition element type;

determine an image region comprising the recognition element type from the sample image based on the pseudo-color image and the region division result; and perform a pathological sampling based on the determined image region.

* * * * *